(12) United States Patent
Suzuki et al.

(10) Patent No.: US 10,568,192 B2
(45) Date of Patent: Feb. 18, 2020

(54) DISCHARGE LAMP DRIVE DEVICE, LIGHT SOURCE DEVICE, PROJECTOR, AND DISCHARGE LAMP DRIVE METHOD

(71) Applicant: SEIKO EPSON CORPORATION, Tokyo (JP)

(72) Inventors: Junichi Suzuki, Matsumoto (JP); Masaru Kono, Toyooka-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,700

(22) Filed: Dec. 21, 2018

(65) Prior Publication Data
US 2019/0199985 A1  Jun. 27, 2019

(30) Foreign Application Priority Data
Dec. 25, 2017  (JP) .................................. 2017-247349

(51) Int. Cl.
*G03B 21/20* (2006.01)
*H05B 41/38* (2006.01)
(Continued)

(52) U.S. Cl.
CPC ..... *H05B 41/3928* (2013.01); *G03B 21/2026* (2013.01); *G03B 21/2053* (2013.01);
(Continued)

(58) Field of Classification Search
CPC ............ G03B 21/2026; G03B 21/2053; G03B 35/16; H05B 41/2928; H05B 37/029;
(Continued)

(56) References Cited

U.S. PATENT DOCUMENTS 6,160,361 A * 12/2000 Giannopoulos ........ H05B 41/36
315/307
6,813,525 B2 * 11/2004 Reid .................... G06Q 10/087
700/19
(Continued)

FOREIGN PATENT DOCUMENTS

JP  2008-304588 A  12/2008
JP  2009-169304 A   7/2009
(Continued)

*Primary Examiner* — Bao-Luan Q Le
(74) *Attorney, Agent, or Firm* — Oliff PLC

(57) ABSTRACT

A discharge lamp drive device includes a discharge lamp driver configured to supply drive electric current to a discharge lamp having a first electrode and a second electrode, a control unit configured to control the discharge lamp driver; and a storage unit configured to store a plurality of drive patterns of the drive electric current. The control unit is configured to select one drive pattern from among the plurality of drive patterns based on machine learning, and implement the selected drive pattern. The control unit is configured to adjust a drive electric power supplied to the discharge lamp based on illumination level information relating to an illumination level of the discharge lamp, while performing switching among the drive patterns based on the machine learning, in a case where an inter-electrode voltage of the discharge lamp is larger than a given voltage value.

13 Claims, 11 Drawing Sheets

(51) Int. Cl.
*H05B 41/39* (2006.01)
*H05B 41/392* (2006.01)
*H04N 9/31* (2006.01)
*H05B 41/24* (2006.01)
*H01J 61/86* (2006.01)
*H05B 41/288* (2006.01)

(52) U.S. Cl.
CPC ............ *H01J 61/86* (2013.01); *H04N 9/3155* (2013.01); *H05B 41/24* (2013.01); *H05B 41/2887* (2013.01); *H05B 41/38* (2013.01)

(58) Field of Classification Search
CPC ............ H05B 41/2883; H05B 41/2887; H05B 41/2921; H05B 41/16; H05B 41/3921; H05B 41/2888; H05B 41/38; H05B 41/2923; H05B 41/2925; H05B 41/2828; H05B 41/24; H05B 41/36; H05B 41/3928; Y02B 20/208; Y02B 20/202; G02B 27/2228; H04N 9/3155
See application file for complete search history.

(56) References Cited

U.S. PATENT DOCUMENTS

| | | | | |
|---|---|---|---|---|
| 8,120,265 B2* | 2/2012 | Van Casteren | .... | G01R 19/0092 315/209 R |
| 8,120,285 B2* | 2/2012 | Terashima | ......... | H05B 41/2887 315/246 |
| 8,907,570 B2* | 12/2014 | Kwag | ................. | H05B 37/029 315/130 |
| 9,599,885 B2* | 3/2017 | Narikawa | .......... | G03B 21/2053 |
| 9,730,304 B2* | 8/2017 | Saka | ...................... | H05B 41/24 |
| 9,785,041 B2* | 10/2017 | Sato | .................... | G03B 21/2053 |
| 2002/0010518 A1* | 1/2002 | Reid | .................... | G06Q 10/087 700/31 |
| 2009/0237009 A1* | 9/2009 | Okawa | ............... | H05B 41/2928 315/307 |
| 2010/0134033 A1* | 6/2010 | Terashima | ......... | H05B 41/2887 315/246 |
| 2010/0315015 A1* | 12/2010 | Van Casteren | .... | G01R 19/0092 315/224 |
| 2011/0221348 A1* | 9/2011 | Kwag | ................ | H05B 37/029 315/130 |
| 2012/0074858 A1* | 3/2012 | Ono | ................... | H05B 41/2883 315/209 R |
| 2012/0162611 A1* | 6/2012 | Terashima | ......... | G03B 21/2053 353/30 |
| 2015/0268544 A1* | 9/2015 | Narikawa | .......... | G03B 21/2053 353/85 |
| 2016/0320693 A1* | 11/2016 | Sato | .................... | G03B 21/2053 |
| 2017/0142816 A1* | 5/2017 | Saka | ...................... | H05B 41/24 |
| 2017/0219919 A1* | 8/2017 | Kito | ................... | H05B 41/2887 |

FOREIGN PATENT DOCUMENTS

| | | |
|---|---|---|
| JP | 2011-103310 A | 5/2011 |
| JP | 2016-018746 A | 2/2016 |
| JP | 2016-213011 A | 12/2016 |

* cited by examiner

DISCHARGE LAMP DRIVE DEVICE, LIGHT SOURCE DEVICE, PROJECTOR, AND DISCHARGE LAMP DRIVE METHOD

BACKGROUND

1. Technical Field

The present invention relates to a discharge lamp drive device, a light source device, a projector, and a discharge lamp drive method.

2. Related Art

For example, as disclosed in JP-A-2016-018764, a discharge lamp lighting device is known that changes a pulse of alternating electric current to be supplied to a discharge lamp according to a value of an application voltage that is applied to the discharge lamp.

However, the discharge lamp has an individual difference, and a change in the application voltage (an inter-electrode voltage) that is applied to the discharge lamp varies according to an individual that is the discharge lamp. For this reason, in some cases, the life of the discharge lamp cannot be sufficiently prolonged with a drive method in which the individual difference of the discharge lamp cannot be considered.

SUMMARY

An advantage of some aspects of the invention is to provide a discharge lamp drive device that is capable of prolonging the life of a discharge lamp without depending on the individual difference of the discharge lamp, a light source device that is equipped with the discharge lamp drive device, and a projector that is equipped with the light source device. Furthermore, another advantage of some aspects of the invention is to provide a discharge lamp drive method that is capable of prolonging the life of a discharge lamp without depending on the individual difference of the discharge lamp.

An aspect of a discharge lamp drive device according to the invention includes: a discharge lamp driver configured to supply drive electric current to a discharge lamp having a first electrode and a second electrode; a control unit configured to control the discharge lamp driver; and a storage unit configured to store a plurality of drive patterns of the drive electric current, in which the control unit is configured to select one drive pattern from among the plurality of drive patterns based on machine learning, and implement the selected drive pattern, and in which the control unit is configured to adjust a drive electric power supplied to the discharge lamp based on illumination level information relating to an illumination level of the discharge lamp, while performing switching among the drive patterns based on the machine learning, in a case where an inter-electrode voltage of the discharge lamp is larger than a given voltage value.

In the aspect of the discharge lamp drive device according to the invention, the control unit selects any one drive pattern from among a plurality of drive patterns, based on machine learning, and implements the selected drive pattern. For this reason, even in a case where there is an individual difference of the discharge lamp, a suitable drive pattern can be selected according to the individual difference of the discharge lamp by performing the machine learning. Therefore, in the discharge lamp drive device according to the aspect of the embodiment, the life of the discharge lamp can be prolonged without depending on the individual difference of the discharge lamp.

Furthermore, because the drive pattern is selected based on the machine learning, even in a case where the drive electric power, which is to be supplied to the discharge lamp, is changed, a suitable drive pattern can be selected according to a change in the drive electric power. Accordingly, it is possible that the drive electric power, which is to be supplied to the discharge lamp, is easily changed in a stepwise manner. Furthermore, because it is possible that the drive electric power is voluntarily changed, it is also possible that the drive electric power is used as one drive parameter of the drive pattern that is changed when prolonging the life of the discharge lamp. Accordingly, the life of the discharge lamp can be more prolonged.

According to the aspect of the discharge lamp drive device according to the invention, the control unit adjusts the drive electric power, which is to be supplied to the discharge lamp, based on the illumination level information relating to the illumination level of the discharge lamp, in a case where the inter-electrode voltage is above the given voltage value. For this reason, in a case where the inter-electrode voltage increases, the drive electric power Wd is increased, and thus the illumination level of the discharge lamp can be suppressed from being lowered. Accordingly, a duration for use in a state where the illumination level maintenance ratio of the discharge lamp is relatively high can be easily extended, and the comfortableness for a user can be improved.

Furthermore, in a case where the drive electric power is maintained as constant, when the inter-electrode voltage increases, an amount of the drive electric current that is to be supplied to the discharge lamp decreases. Because of this, in some cases, thermal load that is applied to the first electrode and the second electrode decreases and it is difficult for a protrusion to grow. In contrast, in the aspect of the discharge lamp drive device according to the invention, the drive electric power can be adjusted according to the illumination level of the discharge lamp. Because of this, a value of the drive electric current can be maintained, and the thermal load that is applied to the first electrode and the second electrode can be suppressed from decreasing. Therefore, sufficient thermal load is easy to apply to the first electrode and the second electrode, and a protrusion is easily caused to grow. As a result, the life of the discharge lamp can be prolonged. Furthermore, as described above, although the drive electric power is changed in this manner based on a change in the inter-electrode voltage, the life of the discharge lamp can be suppressed from being decreased, by using the machine learning.

The discharge lamp drive device may be configured such that the illumination level information includes the inter-electrode voltage, and the control unit adjusts the drive electric power so as to decrease the illumination level of the discharge lamp according to an increase in the inter-electrode voltage, in a case where the inter-electrode voltage is larger than the given voltage value.

For example, a case where the drive electric power is adjusted and the illumination level of the discharge lamp continues to be maintained as an initial illumination level, in some cases, the more the inter-electrode voltage increases, the higher the drive electric power continues to be and the more excessive load is applied to the discharge lamp. For this reason, in some cases, the life of the discharge lamp is decreased.

In contrast, with this configuration, in a case where the inter-electrode voltage is above the given voltage value, the control unit lowers the illumination level of the discharge lamp according to the increase in the inter-electrode voltage. Accordingly, in a case where the inter-electrode voltage is above the given voltage value, the drive electric power that is to be supplied to the discharge lamp decreases compared with a case where the illumination level of the discharge lamp is adjusted to the target illumination level as in the case where the inter-electrode voltage is at or below the given voltage value. Therefore, it is difficult for the load on the discharge lamp to be excessive, and the life of the discharge lamp can be suppressed from being decreased. As a result, the discharge lamp that is capable of maintaining the illumination level of the discharge lamp at a relatively high value is realized for a relatively long duration.

Furthermore, the degree of lowering in the illumination level of the discharge lamp with respect to an amount of the increase in the inter-electrode voltage is sufficiently decreased, and this makes it difficult for the user to notice a change in the illumination level of the discharge lamp. Accordingly, the comfortableness for the user can be suppressed from decreasing. Specifically, an amount of the decrease in the illumination level maintenance ratio for the discharge lamp in a case where the inter-electrode voltage increases by 1 V is set to 3% or less, and this makes it suitably difficult for the user to notice the change in the illumination level of the discharge lamp.

Furthermore, a value of the drive electric power decreases and the load on the discharge lamp is reduced. Thus, the protrusions of the first electrode and the second electrode easily grow and the inter-electrode voltage easily decreases. As a result, the inter-electrode voltage repeats the behavior of exceeding the given voltage value and then falling back to or below the given voltage value, and is maintained in the vicinity of the given voltage value. Accordingly, the inter-electrode voltage can be suppressed from increasing, and while the drive electric power is suppressed to a relatively low degree, the illumination level of the discharge lamp can be maintained. Therefore, the life of the discharge lamp can be prolonged.

The discharge lamp drive device may be configured such that the control unit adjusts the drive electric power so as to decrease the illumination level of the discharge lamp by a given amount of change with respect to the amount of the increase in the inter-electrode voltage, in a case where the inter-electrode voltage is larger than the given voltage value.

With this configuration, in a case where the inter-electrode voltage continues to increase, the illumination level of the discharge lamp can be gradually decreased to a constant degree. Therefore, the user has difficulty noticing the change in the illumination level of the discharge lamp, and the comfortableness for the user can be more suppressed from decreasing.

The discharge lamp drive device may be configured such that the control unit adjusts the drive electric power so as to maintain the illumination level of the discharge lamp as constant without depending on the inter-electrode voltage, in a case where the inter-electrode voltage is equal to or lower than the given voltage value.

With this configuration, the comfortableness for the user can be improved. Furthermore, in a case where the inter-electrode voltage is at or below the given voltage value, the illumination level of the discharge lamp can be maintained in a range where the value of the drive electric power is relatively low. Accordingly, while the load on the discharge lamp is decreased to a relatively low degree, the illumination level of the discharge lamp can be maintained. Therefore, the life of the discharge lamp can be more suppressed from being decreased. Furthermore, because the inter-electrode voltage is easy to maintain as a suitable value, for example, a value in the vicinity of the given voltage value using the machine learning, a duration during which the illumination level maintenance ratio is maintained being 100% can be extended, and the comfortableness for the user can be more improved.

The discharge lamp drive device may be configured such that the control unit supplies the drive electric current whose electric current value is constant to the discharge lamp, in a case where the inter-electrode voltage is equal to or lower than the given voltage value.

With this configuration, the illumination level of the discharge lamp can be maintained as constant.

The discharge lamp drive device may be configured such that the discharge lamp drive device further includes an illumination level sensor configured to measure an illumination level of light emitted from the discharge lamp, and the illumination level information includes a value measured by the illumination level sensor.

With this configuration, the illumination level of the discharge lamp can be directly measured. Because of this, the illumination level of the discharge lamp can be adjusted with more precision to a target value.

An aspect of a light source device according to the invention includes a discharge lamp configured to emit light; and the discharge lamp drive device described above.

According to the aspect of the light source device according to the invention, because the above-described discharge lamp drive device is included, the life of the discharge lamp can be prolonged in the same manner as described above.

An aspect of a projector according to the invention includes: the light source device described above; a light modulation device configured to modulate the light emitted from the light source device according to an image signal; and a projection optical system configured to project the light modulated by the light modulation device.

An aspect of a projector according to the invention includes the light source device described above, a light modulation device configured to modulate the light emitted from the light source device according to an image signal, and a projection optical system configured to project the light modulated by the light modulation device.

An aspect of a discharge lamp drive method according to the invention is a discharge lamp drive method configured to supply drive electric current to a discharge lamp having a first electrode and a second electrode to drive the discharge lamp, the method including: selecting one drive pattern from among a plurality of drive patterns of the drive electric current based on machine learning; implementing the selected drive pattern; and adjusting a drive electric power supplied to the discharge lamp based on illumination level information relating to an illumination level of the discharge lamp, while performing switching among the drive patterns based on the machine learning, in a case where an inter-electrode voltage of the discharge lamp is larger than a given voltage value.

According to the aspect of the discharge lamp drive method according to the invention, the life of the discharge lamp can be prolonged in the same manner as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to the invention will be described below with reference to the drawings.

It is noted that the scope of the invention is not limited to the following embodiments and that any modification to the invention is possible within the scope of the technical idea behind the invention. Furthermore, for easy understanding of each configuration, in some cases, an actual structure and each structure in the following drawings are different from each other in terms of scale, number, or the like.

Figure 1:
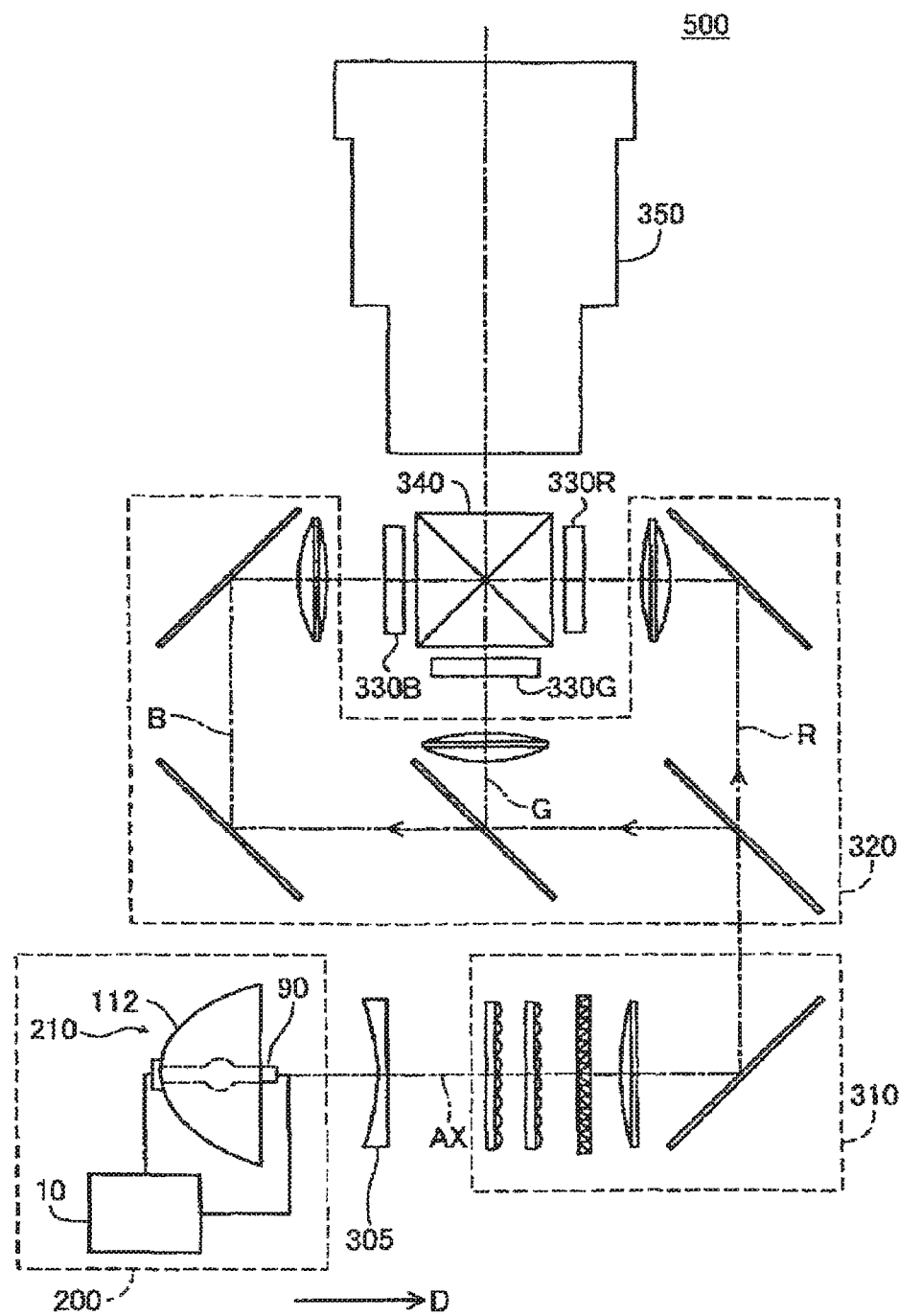
FIG. 1 is a schematic configuration diagram illustrating a projector according to the present embodiment.

FIG. 1 is a schematic configuration diagram illustrating a projector 500 according to the present embodiment. As illustrated in FIG. 1, the projector 500 according to the present embodiment includes a light source device 200, a collimating lens 305, an illumination optical system 310, a color separation optical system 320, three liquid crystal light valves (light modulation devices), including liquid crystal light valves 330R, 330G, and 330B, a cross dichroic prism 340, and a projection optical system 350.

A light that is emitted from the light source device 200 passes through the collimating lens 305 and is incident on the illumination optical system 310. The collimating lens 305 collimates the light from the light source device 200.

The illumination optical system 310 adjusts an illumination level of the light that is emitted from the light source device 200, in a manner that is uniform on the liquid crystal light valves 330R, 330G, and 330B. Moreover, the illumination optical system 310 arranges polarization directions of the light that is emitted from the light source device 200, in one direction. The reason is because the light that is emitted from the light source device 200 is effectively used in the liquid crystal light valves 330R, 330G, and 330B.

The light whose illumination level distribution and polarization direction are adjusted is incident on the color separation optical system 320. The color separation optical system 320 separates the incident light into three color lights, red light (R), green light (G), blue light (B). The three color lights are modulated by the liquid crystal light valves 330R, 330G, and 330B, which correspond to the three color lights themselves, respectively, according to an image signal. The liquid crystal light valves 330R, 330G, and 330B include liquid crystal panels 560R, 560G, and 560B and polarization plates (not illustrated), respectively. The polarization plate is positioned on the light incidence side and the light emission side of each of the liquid crystal panels 560R, 560G, and 560B.

The three modulated color lights are combined by the cross dichroic prism 340. A composite light is incident on the projection optical system 350. The projection optical system 350 projects the incident light onto a screen 700 (refer to FIG. 3). Accordingly, an image is displayed on the screen 700. It is noted that, as a configuration of each of the collimating lens 305, the illumination optical system 310, the color separation optical system 320, cross dichroic prism 340, and the projection optical system 350, a well-known configuration can be employed.

Figure 2:
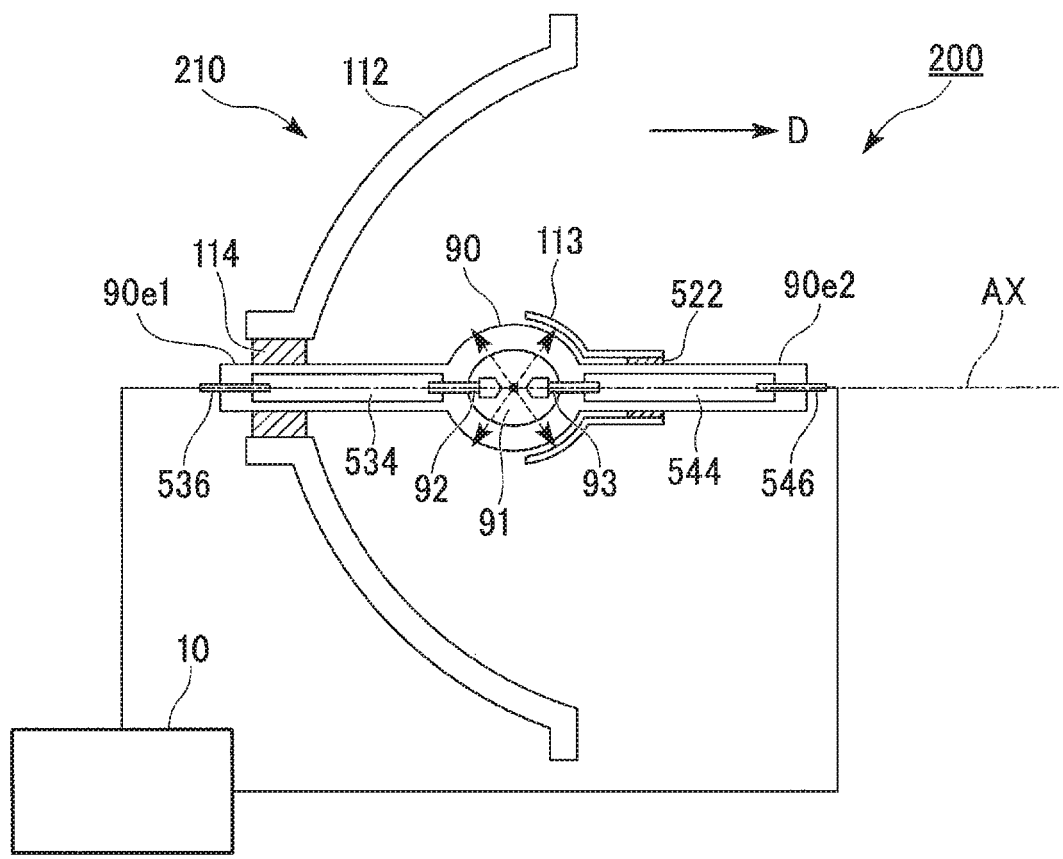
FIG. 2 is a diagram illustrating a discharge lamp in the present embodiment.

FIG. 2 is a cross-sectional diagram illustrating a configuration of the light source device 200. The light source device 200 includes a light source unit 210 and a discharge lamp lighting device (discharge lamp drive device) 10. In FIG. 2, a cross-section of the light source unit 210 is illustrated. The light source unit 210 includes a main reflecting mirror 112, a discharge lamp 90, and a sub-reflecting mirror 113.

An discharge lamp lighting device 10 supplies drive electric current I to the discharge lamp 90 and lights up the discharge lamp 90. The main reflecting mirror 112 reflects the light that is released from the discharge lamp 90, toward an irradiation direction D. The irradiation direction D is in parallel with an optical axis AX of the discharge lamp 90.

The discharge lamp 90 is in the form of a rod that extends along the irradiation direction D. One end portion of the discharge lamp 90 is defined as a first end portion 90e1, and the other end portion of the discharge lamp 90 is defined as a second end portion 90e2. A material of the discharge lamp 90 is, for example, a transmissive material such as quartz glass. The center portion of the discharge lamp 90 expands into the shape of a sphere, and the inside of the center portion is a discharge space 91. Gas that is a discharge medium that includes rare gas, a metal halogen compound, or the like is enclosed in the discharge space 91.

Heads of a first electrode 92 and a second electrode 93 protrude into the discharge space 91. The first electrode 92 is positioned to the first end portion 90e1 side of the discharge space 91. The second electrode 93 is positioned to the second end portion 90e2 side of the discharge space 91. The first electrode 92 and the second electrode 93 are in the form of a rod that extends along the optical axis AX. Electrode head portions of the first electrode 92 and the second electrode 93 are positioned by a given distance apart in a manner that faces each other, in the discharge space 91. Materials of the first electrode 92 and the second electrode 93 are, for example, a metal such as tungsten.

A first terminal 536 is provided in the first end portion 90e1 of the discharge lamp 90. The first terminal 536 and the first electrode 92 are electrically connected by the conductive member 534 that pierces through the discharge lamp 90. In the same manner, a second terminal 546 is provided in the second end portion 90e2 of the discharge lamp 90. The second terminal 546 and the second electrode 93 are electrically connected by a conductive member 544 that pierces through the discharge lamp 90. Materials of the first terminal 536 and the second terminal 546 are, for example, a metal such as tungsten. As materials of the conductive members 534 and 544, for example, a molybdenum foil is used.

The first terminal 536 and the second terminal 546 are connected to the discharge lamp lighting device 10. The discharge lamp lighting device 10 supplies the drive electric current I for driving the discharge lamp 90, to the first terminal 536 and the second terminal 546. As a result, arc discharge occurs between the first electrode 92 and the second electrode 93. A light that occurs by the arc discharge (a discharge light), as illustrated in a broken-line arrow, is radiated from a discharge position toward all directions.

The main reflecting mirror 112 is fixed by the fixation member 114 to the first end portion 90e1 of the discharge lamp 90. The main reflecting mirror 112 reflects a light that travels toward a direction opposite to the irradiation direction D, among discharge lights. A form of a reflection surface (the discharge lamp 90 side surface) of the main reflecting mirror 112 is in a size range where the discharge light can be reflected toward the irradiation direction D. Without any particular limitation, for example, the reflection surface may be in the form of a revolving ellipsoid and may be in the form of a revolving parabola. For example, in a case where the reflection surface of the main reflecting mirror 112 is in the form of a revolving parabola, the main reflecting mirror 112 can convert the discharge light into a light that travels in parallel with the optical axis AX. Accordingly, the collimating lens 305 can be omitted.

The sub-reflecting mirror 113 is fixed by a fixation member 522 to the second end portion 90e2 side of the discharge lamp 90. A reflection surface (the discharge lamp 90 side surface) of the sub-reflecting mirror 113 is in the form of a spherical surface that surrounds the second end portion 90e2 side portion of the discharge space 91. The sub-reflecting mirror 113 reflects a light that travels toward a direction opposite to a direction in which the main reflecting mirror 112 is positioned, among the discharge lights, toward the main reflecting mirror 112. Accordingly, the utilization efficiency of the light that is radiated from the discharge space 91 can be increased.

Materials of the fixation members 114 and 522 are in a range of heat-resistant materials that are resistant to heat that occurs from the discharge lamp 90, and, for example, are an inorganic adhesive without any particular limitation. As a method of fixedly positioning the main reflecting mirror 112 and the sub-reflecting mirror 113, and the discharge lamp 90, any method can be employed without being limited to a method of fixing the main reflecting mirror 112 and the sub-reflecting mirror 113 to the discharge lamp 90. For example, the discharge lamp 90 and the main reflecting mirror 112 may be independently fixed to a casing (not illustrated) of the projector 500. The same is also true for the sub-reflecting mirror 113.

A circuit configuration of the projector 500 will be described below.

Figure 3:
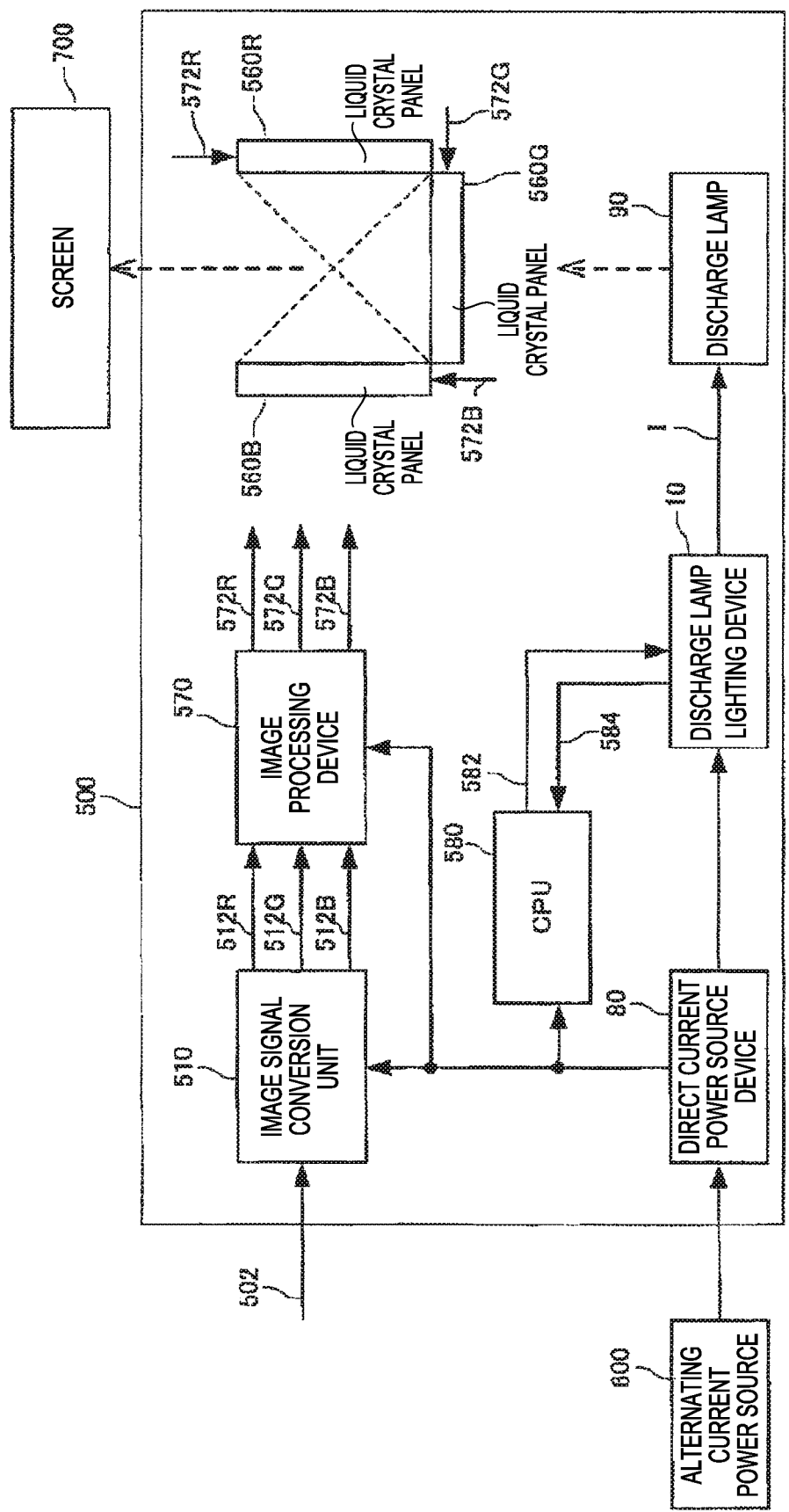
FIG. 3 is a block diagram illustrating various constituent elements of the projector according to the present embodiment.

FIG. 3 is a diagram illustrating an example of the circuit configuration of the projector 500 according to the present embodiment. In addition to an optical system that is illustrated in FIG. 1, the projector 500 includes an image signal conversion unit 510, a direct current power source device 80, the liquid crystal panels 560R, 560G, and 560B, an image processing device 570, and a central processing unit (CPU) 580.

The image signal conversion unit 510 converts an image signal 502 (a luminance—color difference signal, an analog RGB signal, or the like) that is input from the outside, into a digital RGB signal having a given word length, and thus generates image signals 512R, 512G, and 512B, and supplies the generated image signals to the image processing device 570.

The image processing device 570 performs image processing on each of the three image signals, including the image signals 512R, 512G, and 512B. The image processing device 570 supplies drive signals 572R, 572G, and 572B for driving the liquid crystal panels 560R, 560G, and 560B, respectively, to the liquid crystal panels 560R, 560G, and 560B, respectively.

The direct current power source device 80 converts an alternating current voltage that is supplied from an external alternating current power source 600, into a constant direct current voltage. The direct current power source device 80 supplies the direct current voltage to the image signal conversion unit 510 and the image processing device 570 that are positioned to the secondary side of a transformer (is not illustrated, but is included in the direct current power source device 80), and the discharge lamp lighting device 10 that is positioned to the primary side of the transformer.

The discharge lamp lighting device 10, which is activated, generates a high voltage between electrodes of the discharge lamp 90, causes dielectric breakdown, and thus forms a discharge path. Thereafter, the discharge lamp lighting device 10 supplies the drive electric current I necessary for the discharge lamp 90 to maintain discharge.

The liquid crystal panels 560R, 560G, and 560B are included in the liquid crystal light valves 330R, 330G, and 330B, respectively, which are described above. The liquid crystal panels 560R, 560G, and 560B modulate transmittances (luminances) of the color lights that are incident on the liquid crystal panels 560R, 560G, and 560B, respectively, through the optical system described above, based on the drive signals 572R, 572G, and 572B, respectively.

The CPU 580 controls various operations that range from an operation of starting to light up the projector 500 to an operating of lighting out the projector 500. For example, in an example in FIG. 3, a lighting-up command or a lighting-out command is output to the discharge lamp lighting device 10 through a communication signal 582. The CPU 580 receives information on the lighting-up of the discharge lamp 90 from the discharge lamp lighting device 10 through the communication signal 584.

A configuration of the discharge lamp lighting device 10 will be described below.

Figure 4:
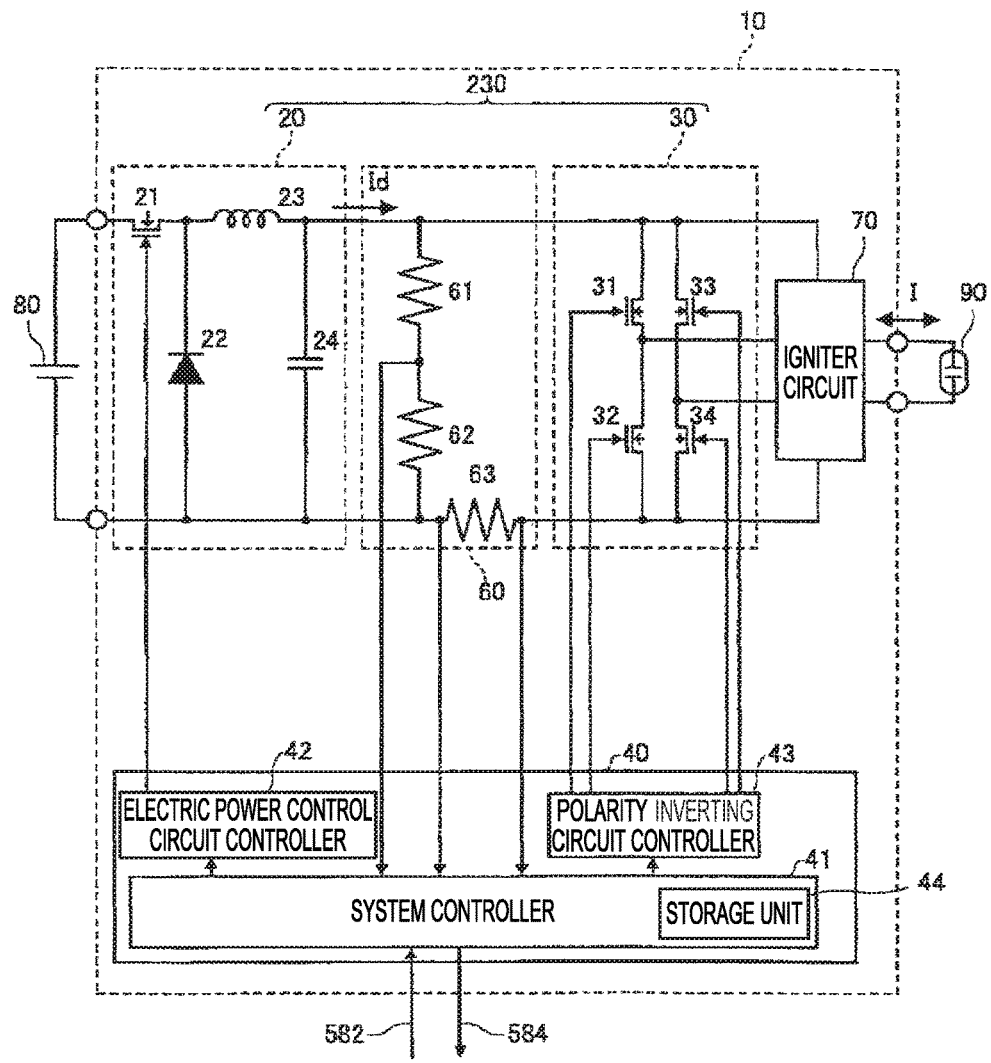
FIG. 4 is a circuit diagram of a discharge lamp lighting device according to the present embodiment.

FIG. 4 is a diagram illustrating an example of a circuit configuration of the discharge lamp lighting device 10.

The discharge lamp lighting device 10, as illustrated in FIG. 4, includes an electric power control circuit 20, a polarity inverting circuit 30, a control unit 40, an operation detection unit 60, and an igniter circuit 70.

The electric power control circuit 20 generates a drive electric power Wd that is to be supplied to the discharge lamp 90. In the present embodiment, the electric power control circuit 20 is configured with a down-chopper circuit into which a voltage from the direct current power source device 80 is input and which steps down the input voltage and thus outputs direct electric current Id.

The electric power control circuit 20 is configured to include a switching element 21, a diode 22, a coil 23, and a capacitor 24. The switching element 21, for example, is configured with a transistor. In the present embodiment, one end of the switching element 21 is connected to the positive voltage side of the direct current power source device 80, and the other end is connected to a cathode terminal of the diode 22 and one end of the coil 23.

One end of the capacitor 24 is connected to the other end of the coil 23, and the other end of the capacitor 24 is connected to an anode terminal of the diode 22 and the negative voltage side of the direct current power source device 80. An electric current control signal from the control unit 40 that will be described below is input into a control terminal of the switching element 21, and turning-on and turning-off of the switching element 21 are controlled. For example, a pulse width modulation (PWN) control signal may be used for the electric current control signal.

When the switching element 21 is turned on, electric current flows through the coil 23, and energy is stored up in the coil 23. Thereafter, when the switching element 21 is turned off, the energy that is stored up in the coil 23 is released along a path between the capacitor 24 and the diode 22. As a result, the direct electric current Id in accordance with a time ratio at which the switching element 21 is turned on occurs.

The polarity inverting circuit 30 inverts a polarity of the direct electric current Id that is input from the electric power control circuit 20, at a given timing. Accordingly, the polarity inverting circuit 30 generates and outputs the drive electric current I that is direct current which continues only for a controlled time, or the drive electric current I that is alternating current which has any frequency. In the present embodiment, the polarity inverting circuit 30 is configured with an inverter bridge circuit (a full bridge circuit).

The polarity inverting circuit 30, for example, includes a first switching element 31, a second switching element 32, a third switching element 33, and a fourth switching element 34, each of which is configured with a transistor and the like. The polarity inverting circuit 30 has a configuration in which the first switching element 31 and the second switching element 32 that are serially connected, and the third switching element 33 and the fourth switching element 34 that are serially connected are connected in parallel. A polarity inverting control signal from the control unit 40 is input into a control terminal of each of the control terminals of the first switching element 31, the second switching element 32, the third switching element 33, and the fourth switching element 34. Based on the polarity inverting control signal, operations of turning on and turning off the first switching element 31, the second switching element 32, the third switching element 33, and the fourth switching element 34 are controlled.

In the polarity inverting circuit 30, an operation of alternately turning on and turning off the first switching element 31 and the fourth switching element 34, and the second switching element 32 and the third switching element 33 is repeated. Accordingly, polarities of the direct electric current Id that is output from the electric power control circuit 20 are alternately inverted. The polarity inverting circuit 30 generates and outputs the drive electric current I that is direct current which continues the same polarity state only for a controlled time, or the drive electric current I that is alternating current which has a control frequency, from a connection point that is shared between the first switching element 31 and the second switching element 32, and a connection point that is shared between the third switching element 33 and the fourth switching element 34.

That is, the polarity inverting circuit 30 is controlled in such a manner that the second switching element 32 and the third switching element 33 are turned off when the first switching element 31 and the fourth switching element 34 are turned on and in such a manner that the second switching element 32 and the third switching element 33 are turned on when the first switching element 31 and the fourth switching element 34 are turned off. Therefore, when the first switching element 31 and the fourth switching element 34 are turned on, the drive electric current I occurs that is to flow from one end of the capacitor 24 through the first switching element 31, the discharge lamp 90, and the fourth switching element 34 in this order. When the second switching element 32 and the third switching element 33 are turned on, the drive electric current I occurs that is to flow from one end of the capacitor 24 through the third switching element 33, the discharge lamp 90, and the second switching element 32 in this order.

In the present embodiment, a portion that results from combining the electric power control circuit 20 and the polarity inverting circuit 30 corresponds to a discharge lamp driver 230. That is, the discharge lamp driver 230 supplies the drive electric current I that drives the discharge lamp 90 to the discharge lamp 90.

The control unit 40 controls the discharge lamp driver 230. In an example in FIG. 4, the control unit 40 controls the electric power control circuit 20 and the polarity inverting circuit 30, and thus controls the time for which the drive electric current I continues to retain the same polarity, an electric current value (an electric power value of the drive electric power Wd) of the drive electric current I, and a parameter for a frequency or the like. The control unit 40 performs the polarity inverting control that controls the time for which the drive electric current I continues to retain the same polarity, and a frequency and the like of the drive electric current I, on the polarity inverting circuit 30, at a polarity inverting timing for the drive electric current I. The control unit 40 performs electric current control that controls an electric current value of the direct electric current Id that is output, on the electric power control circuit 20.

The control unit 40 in the present embodiment, for example, possibly performs an alternating current drive and a direct current drive. The alternating current drive is a drive for supplying alternating electric current to the discharge lamp 90. The direct current drive is a drive for supplying direct electric current to the discharge lamp 90. A drive electric current waveform of the drive electric current I that, with each discharge lamp drive, is supplied to the discharge lamp 90 will be described below.

A configuration of the control unit 40 is not particularly limited. In the present embodiment, the control unit 40 is configured to include a system controller 41, an electric power control circuit controller 42, and a polarity inverting circuit controller 43. It is noted that one or several portions, or all portions of the control unit 40 may be configured with a semiconductor integrated circuit.

The system controller 41 controls the electric power control circuit controller 42 and the polarity inverting circuit controller 43, and thus controls the electric power control circuit 20 and the polarity inverting circuit 30. The system controller 41 may control the electric power control circuit controller 42 and the polarity inverting circuit controller 43 based on a lamp voltage (an inter-electrode voltage) Vla and the drive electric current I that are measured by the operation detection unit 60.

In the present embodiment, a storage unit 44 is connected to the system controller 41.

Based on information that is stored in the storage unit 44, the system controller 41 may control the electric power control circuit 20 and the polarity inverting circuit 30. A plurality of drive patterns DW of the drive electric current I are stored in the storage unit 44. More specifically, for example, pieces of information relating to each drive that constitutes each drive pattern DW, and relating to drive parameters, such as a length of time for which the drive is performed, an electric current value of the drive electric current I, a frequency, a periodicity, a polarity, a waveform, and a modulation pattern, are stored in the storage unit 44. Each drive pattern DW of the drive electric current I includes at least one of the alternating current drive and the direct current drive, which are described above. The drive pattern DW will be described in detail below.

Based on a control signal from the system controller 41, the electric power control circuit controller 42 outputs the electric current control signal to the electric power control circuit 20, and thus controls the electric power control circuit 20.

Based on the control signal from the system controller 41, the polarity inverting circuit controller 43 outputs the polarity inverting control signal to the polarity inverting circuit 30, and thus controls the polarity inverting circuit 30.

The control unit 40 performs machine learning. The control unit 40 selects any one drive pattern DW from among a plurality of drive patterns DW that are stored in the storage unit 44, based on the machine learning, and implements the selected drive pattern DW. The machine learning will be described in detail below.

The control unit 40 can be realized using a dedicated circuit, and can be set to perform the control described above or various controls of processing operations that will be described below. In contrast, the control unit 40, for example, can function as a computer by the CPU executing a control program that is stored in the storage unit 44, and can also be set to perform various controls of these processing operations.

Figure 5:
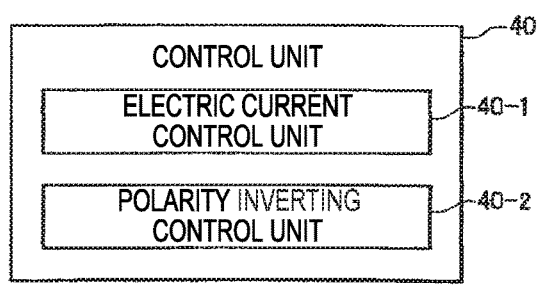
FIG. 5 is a block diagram illustrating an example of a configuration of a control unit according to the present embodiment.

FIG. 5 is a diagram for describing another example of the configuration of the control unit 40. As illustrated in FIG. 5, with a control program, the control unit 40 may be configured in such a manner as to function as an electric current control unit 40-1 that controls the electric power control circuit 20 and a polarity inverting control unit 40-2 that controls the polarity inverting circuit 30.

In an example that is illustrated in FIG. 4, the control unit 40 is configured as one portion of the discharge lamp lighting device 10. In contrast, a configuration may be employed in which a CPU 580 plays a role in performing one portion of a function of the control unit 40.

In the present embodiment, the operation detection unit 60 includes a voltage measurement unit that measures a lamp voltage Vla of the discharge lamp 90 and outputs lamp voltage information to the control unit 40. Furthermore, the operation detection unit 60 may include an electric current measurement unit or the like that measures the drive electric current I and outputs drive electric current information to the control unit 40. In the present embodiment, the operation detection unit 60 is configured to include a first resistor 61, a second resistor 62, and a third resistor 63.

In the present embodiment, with a voltage that results from voltage division in the first resistor 61 and the second resistor 62, which is serially connected to each other in a manner that is in parallel with the discharge lamp 90, the voltage measurement unit of the operation detection unit 60 measures the lamp voltage Vla. Furthermore, in the present embodiment, with a voltage that occurs in the third resistor 63 that is serially connected to the discharge lamp 90, the electric current measurement unit measures the drive electric current I.

The igniter circuit 70 operates only when the discharge lamp 90 starts to be lighted up. The igniter circuit 70 supplies a high voltage (a voltage that is higher than when the discharge lamp 90 usually starts to be lighted up) necessary for causing the dielectric breakdown between the electrodes (between the first electrode 92 and the second electrode 93) of the discharge lamp 90 and forming the discharge path when the discharge lamp 90 starts to be lighted up, between the electrodes (between the first electrode 92 and the second electrode 93) of the discharge lamp 90. In the present embodiment, the igniter circuit 70 is connected in parallel to the discharge lamp 90.

Figure 6A:
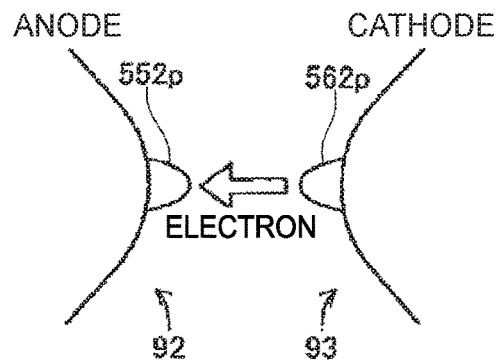
FIG. 6A is a diagram illustrating a state of a protrusion on an electrode head portion of the discharge lamp.
Figure 6B:
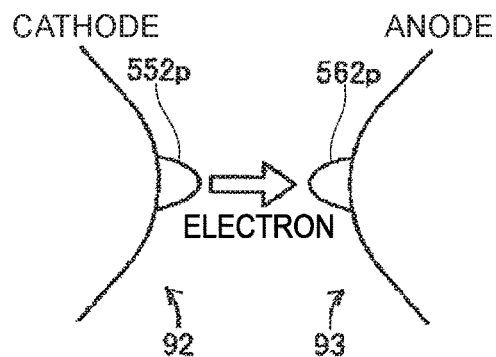
FIG. 6B is a diagram illustrating the state of the protrusion on the electrode head portion of the discharge lamp.

In FIGS. 6A and 6B, head portions of the first electrode 92 and the second electrode 93 are illustrated. Protrusions 552p and 562p are formed on heads of the first electrode 92 and the second electrode 93, respectively. FIG. 6A illustrates a first polarity state in which the first electrode 92 operates as a anode and the second electrode 93 operates as a cathode. In the first polarity state, with the discharge, an electron moves from the second electrode 93 (a cathode) to the first electrode 92 (an anode). The electron is released from the cathode (the second electrode 93). The electron that is released from the cathode (the second electrode 93) collides with a head of the anode (the first electrode 92). Due to the collision, heat occurs and a temperature of the head (the protrusion 552p) of the anode (the first electrode 92) rises.

FIG. 6B illustrates a second polarity state in which the first electrode 92 operates as the cathode and the second electrode 93 operates as the anode. In the second polarity state, unlike in the first polarity state, an electron moves from the first electrode 92 to the second electrode 93 in the reverse direction. As a result, a temperature rises in the head (the protrusion 562p) of the second electrode 93.

In this manner, the drive electric current I is supplied to the discharge lamp 90, and thus a temperature rises in the anode in which electrons collide with each other. On the other hand, the cathode that releases an electron drops in a temperature while an electron is released toward the anode.

A distance between the first electrode 92 and the second electrode 93 increases with degradation in the protrusions 552p and 562p. This is because the protrusions 552p and 562p are worn out. When the distance between the electrodes increases, resistance between the first electrode 92 and the second electrode 93 increases, and because of this, the lamp voltage Vla increases. Therefore, with reference to the lamp voltage Vla, a change in the distance between the electrodes, that is, the degree of a degradation in the discharge lamp 90 can be measured.

It is noted that in some cases, because the first electrode 92 and the second electrode 93 have the same configuration, only the first electrode 92 is representatively described below. Furthermore, in some cases, because the protrusion 552p of the head of the first electrode 92, and the protrusion 562p of the head of the second electrode 93 have the same configuration, only the protrusion 552p is representatively described below.

Control of the discharge lamp driver 230 by the control unit 40 according to the present embodiment will be described below. With at least one of the alternating current drive and the direct current drive, the control unit 40 in the present embodiment controls the discharge lamp driver 230.

The control unit 40 in the present embodiment possibly performs a plurality of drive patterns DW each of which results from combining one or more drives that will be described below. Regarding each drive pattern DW in the present embodiment, at least one among the drive parameters in each drive that constitutes the drive pattern DW has drive electric current waveforms which are different from each other.

Figure 7:
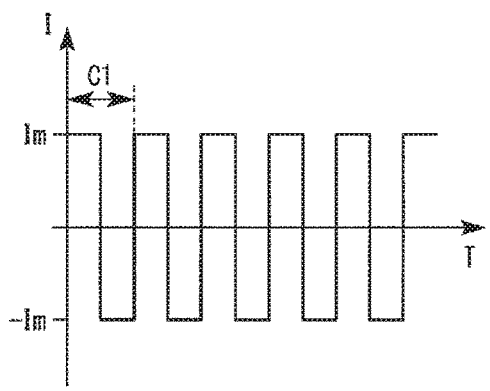
FIG. 7 is a diagram illustrating an example of a drive electric current waveform that is supplied to the discharge lamp in an alternating current drive according to the present embodiment.
Figure 8A:
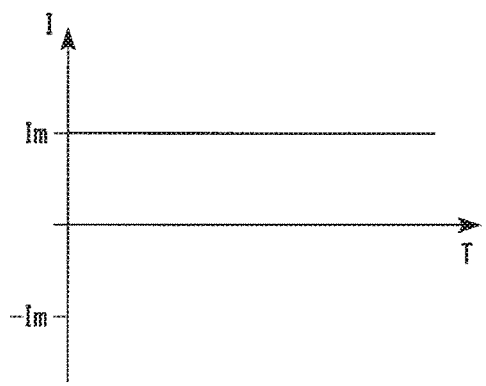
FIG. 8A is a diagram illustrating an example of the drive electric current waveform that is supplied to the discharge lamp in a direct current drive according to the present embodiment.
Figure 8B:
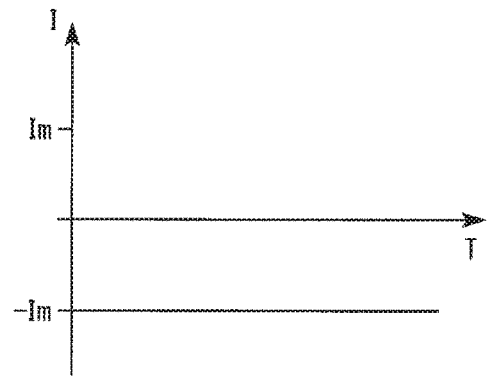
FIG. 8B is a diagram illustrating an example of the drive electric current waveform that is supplied to the discharge lamp in the direct current drive according to the present embodiment.

Each drive will be described below. FIG. 7 is a diagram illustrating an example of the drive electric current waveform that is supplied to the discharge lamp 90 in the alternating current drive. FIGS. 8A and 8B are diagrams each illustrating an example of the drive electric current waveform that is supplied to the discharge lamp 90 in the direct current drive. In FIGS. 7, 8A and 8B, the vertical axis represents the drive electric current I, and the horizontal axis represents time T. It is illustrated that the drive electric current I is set to be positive in the case of the first polarity state and is set to be negative in the case of the second polarity state.

The drive electric current I that is supplied to the discharge lamp 90 in the alternating current drive that is illustrated in FIG. 7, for example, is rectangular-wave alternating electric current of which a polarity is inverted a plurality of times between an electric current value Im and an electric current value −Im. In the alternating electric current that is illustrated in FIG. 7, a length of a periodicity C1 is constant. A duty ratio of the alternating electric current that is illustrated in FIG. 7 is 0.5 (50%).

The drive electric current I that is supplied to the discharge lamp 90 in the direct current drive that is illustrated in FIG. 8A is the direct electric current at the first polarity having a constant electric current value Im. The drive electric current I that is supplied to the discharge lamp 90 in the direct current drive that is illustrated in FIG. 8B is that direct electric current at a second polarity having a constant electric current value −Im.

Figure 9:
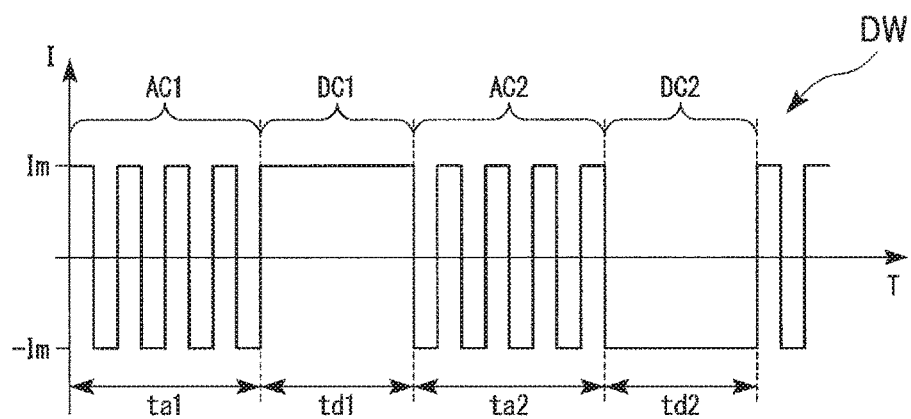
FIG. 9 is a diagram illustrating an example of a drive pattern of drive electric current that is supplied to the discharge lamp in the present embodiment.

FIG. 9 is a diagram illustrating an example of the drive pattern DW of the drive electric current I that is supplied to the discharge lamp 90 in the present embodiment. In FIG. 9, the vertical axis represents the drive electric current I, and the horizontal axis represents time T.

The drive pattern DW that is illustrated in FIG. 9 is configured from the alternating current drive and the direct current drive. More specifically, the drive pattern DW in FIG. 9 is configured from a first alternating current drive AC1, a first direct current drive DC1, a second alternating current drive AC2, and a second direct current drive DC2. Then, the drive pattern DW has a plurality of drive parameters relating to each alternating current drive and each direct current drive. For example, the first alternating current drive AC1 has a length ta1 of the time for performing the alternating current drive, and a first frequency f1 of the alternating electric current, as the drive parameters. The first direct current drive DC1 has a length td1 of the time for performing the direct current drive and the first polarity, as the drive parameters. For example, the second alternating current drive AC2 has a length ta2 of the time for performing the alternating current drive, and a second frequency f2 of the alternating electric current, as the drive parameters. The second direct current drive DC2 has a length td2 of the time for performing the direct current drive and the second polarity, as the drive parameters.

It is noted that, in the case of the drive pattern DW in FIG. 9, the length ta1 of the time for performing the first alternating current drive AC1 and the length ta2 of the time for performing the second alternating current drive AC2 are the same, and further that the length td1 of the time for performing the first direct current drive DC1 and the length td2 of the time for performing the second direct current drive DC2 are the same. Moreover, in the case of the drive pattern DW in FIG. 9, the first frequency f1 of the alternating electric current in the first alternating current drive AC1, and the second frequency f2 of the alternating electric current in the second alternating current drive AC2 are the same.

The first frequency f1 and the second frequency f2, for example, are equal to or higher 100 Hz and are equal to or lower than 1 kHz. The length ta1 of the time for performing the first alternating current drive AC1 and the length to 2 of the time for performing the second alternating current drive AC2, for example, are equal to or longer than 10 ms (millisecond) and are equal to or shorter than 10 s (second). The length td1 of the time for performing the first direct current drive DC1 and the length td2 of the time for performing the second direct current drive DC2, for example, are equal to or longer than 10 ms (millisecond) and are equal to or shorter than 40 ms (millisecond).

A plurality of drive patterns DW, for example, are configured by suitably combining a plurality of numerical values that are selected from a range of numeral values of each drive parameter in each of the drives described above. For example, it is preferable that a sum of types of drive parameters in each drive, which are combined for use, is equal to or greater than 2 and is equal to or smaller than 6 and that the numerical value that is prepared for every type of drive parameter is equal to or greater than 2 and is equal to or smaller than 6. A plurality of drive patterns DW are configured by combining these, and thus a preferable number of drive patterns DW are obtained.

For example, the drive parameters that are described above with the drive pattern DW that is illustrated in FIG. 9 are the length of the time for performing the alternating current drive, the frequency of the alternating electric current in the alternating current drive, the length of the time for performing the direct current drive, and the polarity of the direct current drive. In this case, the sum of types of drive parameters in each drive is 4.

A plurality of drive patterns DW are different from each other in terms of a value of at least one drive parameter among the plurality of drive parameters described above. The number of drive patterns DW, for example, is equal to or greater than 3, and is equal to or smaller than 150. Preferably, the number of drive patterns DW is equal to or greater than 10, and is equal to or smaller than 100. More preferably, the number of drive patterns DW, for example, is equal to or greater than 20, and is equal to or greater than 30. The number of drive patterns DW is set in this manner, and thus the life of the discharge lamp 90 can be more prolonged.

Next, the switching among the drive patterns DW by the control unit 40 according to the present embodiment will be described. Based on the machine learning, the control unit

40 can switch among the drive patterns DW. The control unit 40 in the present embodiment makes an evaluation of the drive pattern DW based on a change in the lamp voltage Vla, and makes a selection of the drive pattern DW based on the evaluation of the drive pattern DW.

Figure 10:
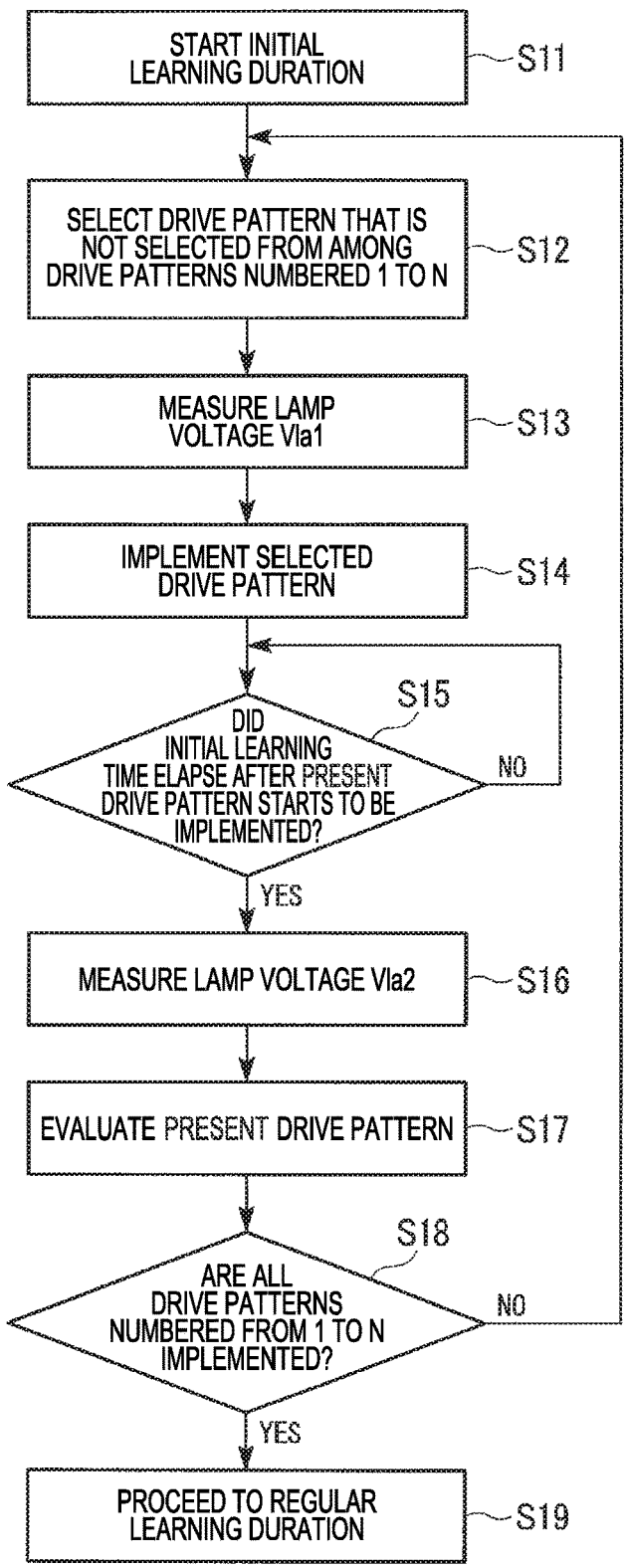
FIG. 10 is a flowchart illustrating an example of a procedure for control by the control unit during an initial learning duration according to the present embodiment.

In the present embodiment, an initial learning duration during which an initial evaluation of a plurality of drive patterns DW is performed, and a regular learning duration that is provided after the initial learning duration are provided. FIG. 10 is a flowchart illustrating an example of a procedure for control by the control unit 40 during the initial learning duration. It is noted that in the following description, N drive patterns DW are provided and the N drive patterns DW are numbered from 1 to N.

As illustrated in FIG. 10, after starting the initial learning duration (Step S11), the control unit 40 selects the drive pattern DW that is not selected during the initial learning duration, from among the drive pattern DW numbered from 1 to N (Step S12). The control unit 40, for example, randomly selects the drive pattern DW that is not selected. Because none of the drive patterns DW is selected immediately after starting the initial learning duration, the control unit 40 selects one drive pattern DW from among the drive patterns DW numbered from 1 to N. Next, the voltage measurement unit of the operation detection unit 60 measures the lamp voltage Vla1 of the discharge lamp 90 (Step S13), and the control unit 40 stores the measured lamp voltage Vla1 in the storage unit 44. Then the control unit 40 implements the selected drive pattern DW (Step S14).

After starting to implement the drive pattern DW, the control unit 40 determines whether or not an initial learning time elapsed after the drive pattern DW that is presently selected starts to be implemented (Step S15). A length of the initial learning time, for example, is equal to or longer than 10 min (minutes), and is equal to or shorter than 120 min (minutes). In a case where the initial learning time did not elapse after the drive pattern DW that is presently selected starts to be implemented (No in Step S15), the control unit 40 continues to implement the drive pattern DW that is presently selected.

On the other hand, in a case where the initial learning time elapsed after the drive pattern DW that is presently selected starts to be implemented (YES in Step S15), the voltage measurement unit of the operation detection unit 60 measures a lamp voltage Vla2 of the discharge lamp 90 (Step S16), and the control unit 40 stores the measured lamp voltage Vla2 in the storage unit 44. Then, the control unit 40 evaluates the drive pattern DW that is presently selected (Step S17).

The evaluation of the drive pattern DW in the present embodiment is made based on the change in the lamp voltage Vla. Specifically, the control unit 40 evaluates the drive pattern DW based on a value of the lamp voltage Vla2 that results after the selected drive pattern DW is implemented for the initial learning time, and on a difference of the lamp voltage Vla2 that results after the drive pattern DW is implemented for the initial learning time, with respect to the lamp voltage Vla1 that is available before the selected drive pattern DW is implemented. In the following description, a difference of the lamp voltage Vla2 that results after the drive pattern DW is implemented for the initial learning time, with respect to the lamp voltage Vla1 that is available before the drive pattern DW is implemented is referred to as a first change voltage value.

At this point, a target numerical value range is set for the lamp voltage Vla. The control unit 40 selects and implements each drive pattern DW in such a manner that the lamp voltage Vla can be maintained in the target numerical value range. The range of the target numerical value, for example, is from 60 V or higher to less than 65 V. Cases where a result of the evaluation of the drive pattern DW is at a relatively high level, for example, include a case where one drive pattern DW is implemented and thus the lamp voltage Vla (the lamp voltage Vla2 that results after one drive pattern DW is implemented for the initial learning time) falls within the target numerical value range, a case where one drive pattern DW is implemented and thus the lamp voltage Vla approaches the target numerical value range, a case where the lamp voltage Vla that is available or results before or after one drive pattern DW is implemented can be maintained to be in the target numerical value range, and the like. Furthermore, a case where the result of the evaluation of the drive pattern DW is at a relatively low level, for example, includes a case where one drive pattern DW is implemented and thus the lamp voltage Vla is outside of the target numerical value range, a case where one drive pattern DW is implemented and thus there is a big difference of the lamp voltage Vla with respect to the target numerical value range, and the like.

As an example, in a case where the lamp voltage Vla2 that results after one drive pattern DW is implemented for the initial learning time is higher than that within the target numerical value range, and where the first change voltage value is a negative value, a result of the evaluation of the selected one drive pattern DW is at a relatively high level. Furthermore, in a case where the lamp voltage Vla2 that results after one drive pattern DW is implemented for the initial learning time is higher than that within the target numerical value range and where the first change voltage value is a positive value, the result of the evaluation of the selected one drive pattern DW is at a relatively low level. On the other hand, in a case where the lamp voltage Vla2 that results after one drive pattern DW is implemented for the initial learning time is lower than that within the target numerical value range and where the first change voltage value is a negative value, the result of the evaluation of the selected one drive pattern DW is at a relatively low level. Furthermore, in a case where the lamp voltage Vla2 that results after one drive pattern DW is implemented for the initial learning time is smaller than that within the target numerical value range and where the first change voltage value is a positive value, the result of the evaluation of the selected one drive pattern DW is at a relatively high level. Moreover, in a case where the lamp voltage Vla2 that results after one drive pattern DW is implemented for the initial learning time is within the target numerical value range, as an absolute value of the first change voltage value is lower, the result of the evaluation of the selected one drive pattern DW is at a relatively higher level. On the other hand, as the absolute value of the first change voltage value is higher, the result of the evaluation of the selected one drive pattern DW is at a relatively lower level.

It is noted that the first change voltage value being a negative value means that one drive pattern DW is implemented for the initial learning time and thus that the lamp voltage Vla drops. The first change voltage value being a positive value means that one drive pattern DW is implemented for the initial learning time and thus that the lamp voltage Vla rises.

After the selected drive pattern DW is evaluated, the control unit 40 determines whether or not the drive patterns DW numbered from 1 to N are all implemented for the initial learning duration (Step S18). In a case where the drive pattern DW that is not implemented during the initial learning duration is present among the drive patterns DW numbered from 1 to N (NO in Step S18), the control unit 40 selects, implements, and evaluates any other drive pattern DW (Steps S12 to S17). On the other hand, in a case where the N drive patterns DW numbered from 1 to N are all implemented during the initial learning duration (YES in Step S18), the control unit 40 ends the initial learning duration and proceeds to the regular learning duration (Step S19). A length of the initial learning duration, for example, is less than 10 h (hours).

In the present embodiment, the drive pattern DW that is not selected from among the plurality of drive patterns DW is selected in Step S12 and then the lamp voltage Vla of the discharge lamp 90 is measured by the voltage measurement unit of the operation detection unit 60, as the lamp voltage Vla1 that is available before the selected drive pattern DW is performed, but no limitation to this is imposed. The lamp voltage Vla1 that is available before the selected X-th drive pattern DW, for example, may be to be the lamp voltage Vla2 that is measured after a selected (X−1)-th drive pattern DW that immediately precedes the selected X-th drive pattern DW is implemented for the initial learning time. With this control, the measurement of the lamp voltage Vla1 in Step S13 is unnecessary, and the processing for the initial evaluation can be more simplified.

Figure 11:
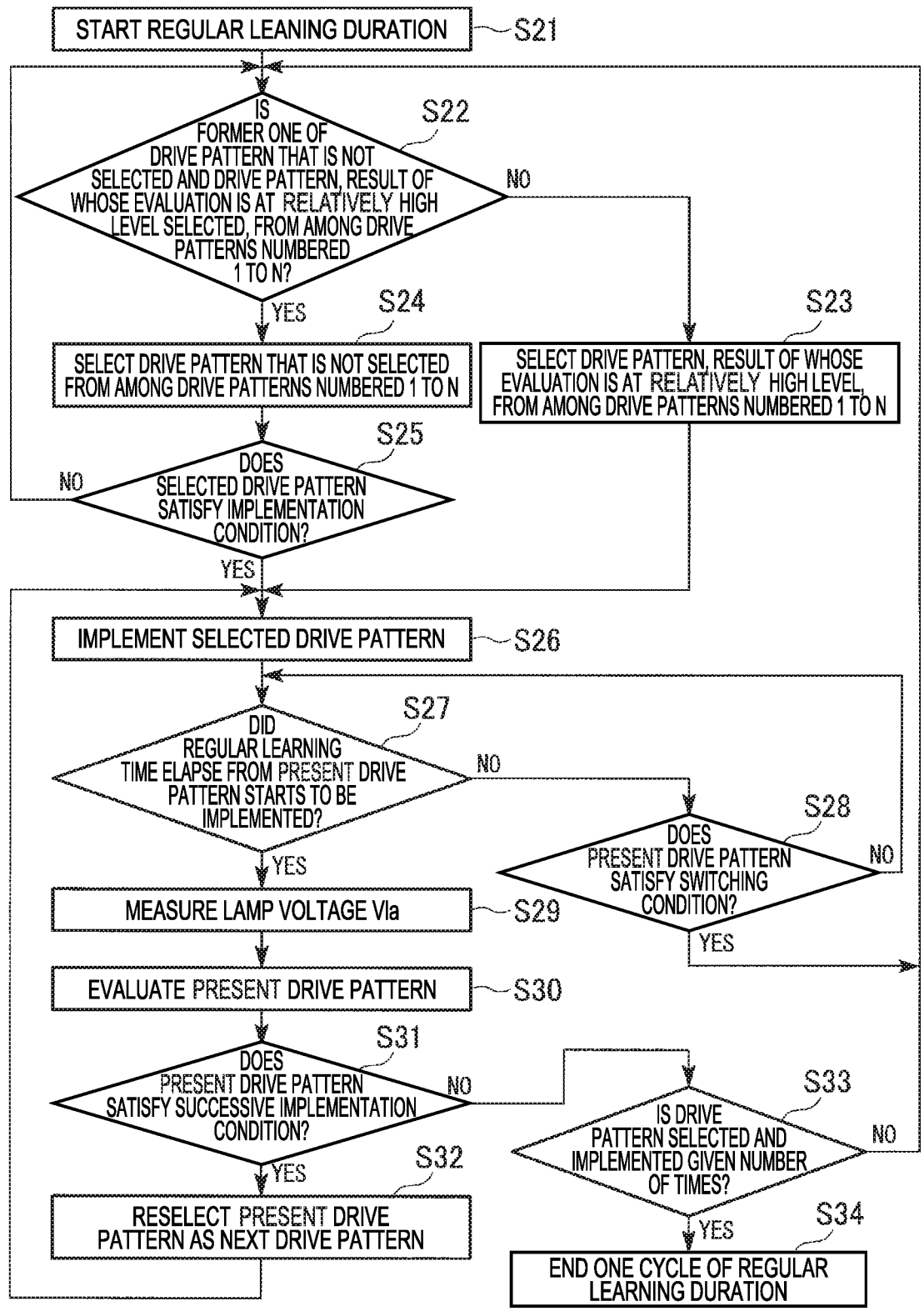
FIG. 11 is a flowchart illustrating an example of a procedure for control by the control unit during a regular learning duration according to the present embodiment.

FIG. 11 is a flowchart illustrating an example of a procedure for control by the control unit 40 during the regular learning duration. In FIG. 11, one cycle during the regular learning duration is illustrated. The control unit 40 in the regular learning duration repeats one cycle as illustrated in FIG. 11. As illustrated in FIG. 11, after starting the regular learning duration (Step S21), the control unit 40 selects one drive pattern DW of the drive pattern DW that is not selected during the regular learning duration and the drive pattern DW, the result of whose evaluation is at a relatively high level, among the drive pattern DWs numbered from 1 to N (Steps S22 to S24). It is noted that the control unit 40, for example, randomly selects the drive pattern DW from among the drive patterns DW numbered from 1 to N.

More specifically, for example, the control unit 40 determines whether or not to select the former one (the drive pattern DW that is not selected during the regular learning duration) of the drive pattern DW that is not selected during the regular learning duration and the drive pattern DW, the result of whose evaluation is at a relatively high level, from among the drive patterns DW numbered from 1 to N (Step S22), and, in a case where the drive pattern DW at a relatively high level is selected (NO in Step S22), selects the drive pattern DW, the result of whose evaluation is at a relatively high level, from among the drive patterns DW numbered from 1 to N (Step S23). The control unit 40, for example, selects the drive pattern DW, the result of whose evaluation is at the highest level, that is, the drive pattern DW that causes the lamp voltage Vla to be the closest to the target numerical value range of the lamp voltage Vla, from among the drive patterns DW numbered from 1 to N. Then, the control unit 40 implements the drive pattern DW that is selected in Step S23 (Step S26).

On the other hand, in a case where the former one that is the drive pattern DW which is not selected during the regular learning duration is selected (YES in Step S22), the control unit 40 selects the drive pattern DW that is not selected during the regular learning duration, from among the drive patterns DW numbered from 1 to N (Step S24). Then, in a case where the drive pattern DW that is not selected during the regular learning duration is selected, the control unit 40 determines whether or not the selected drive pattern DW satisfies an implementation condition (Step S25). The implementation condition, for example, includes a condition that, when the selected drive pattern DW is previously selected and is implemented, switching to any other drive pattern DW does not take place in Step S28 that will be described below.

In a case where the drive pattern DW which is selected in Step S24 satisfies the implementation condition (YES in Step S25), proceeding to Step S26 takes place and the control unit 40 implements the selected drive pattern DW. On the other hand, in a case where the selected drive pattern DW does not satisfy the implementation condition (NO in Step S25), proceeding to Step S22 takes place, and the control unit 40 selects any other drive pattern DW from among the drive patterns DW numbered from 1 to N and makes the same determination as described above.

Next, after the selected drive pattern DW starts to be implemented, the control unit 40 determines whether or not the regular learning time elapses after the drive pattern DW that is presently selected starts to be implemented (Step S27). The regular learning time, the elapse of which is determined in Step S27, for example, is the same as the initial learning time, the elapse of which is determined during the initial learning duration in Step S15. That is, a length of the regular learning time, for example, is equal to or longer than 10 min (minutes), and is equal to or shorter than 120 min (minutes). In a case where the regular learning time did not elapse after the drive pattern DW that is presently selected starts to be implemented (NO in Step S27), the control unit 40 determines whether or not the present drive pattern DW satisfies a switching condition (a first given condition) (Step S28).

The switching condition, for example, includes a condition that any one of a first switching condition and a second switching condition is satisfied. The first switching condition is that while the present drive pattern DW is being performed, an absolute value of the change (a change voltage value) in the lamp voltage Vla that is measured within the regular learning time is a first given value or higher and the measured lamp voltage Vla is outside of the target numerical value range. The second switching condition includes a condition that, in a case where the time elapsed after the present drive pattern DW starts to be implemented is a first given time or less, the absolute value of the change in the lamp voltage Vla is a second given value or less. The first time is shorter than the regular learning time, and for example, is 5 min (minutes). The second given value is shorter than the first given value. The first given value, for example, is 5 V. The second given value, for example, is 3 V.

That is, when the elapsed time is the first time or less, in a case where the absolute value of the change in the lamp voltage Vla is the second given value or higher, which is lower than the first given value, the switching condition (the second switching condition) is also set to be satisfied. Furthermore, when the first time is exceeded, in a case where the change in the lamp voltage Vla is the first given value or higher, which is higher than the second given value, the switching condition (the first switching condition) is set not to be satisfied. With this relationship, the control unit 40 determines the switching from the drive pattern DW that is presently selected, in a stepwise manner, based on the time for implementing the drive pattern DW that is presently selected and the lamp voltage Vla.

In a case where the drive pattern DW that is presently selected satisfies the switching condition (YES in Step S28), the control unit 40 determines that, in a present state of the discharge lamp 90, the drive pattern DW that is presently selected is the drive pattern DW that is not preferable for prolonging the life of the discharge lamp 90. Then, the control unit 40 sets the result of the evaluation of the drive pattern DW that is presently selected, to be a low level.

Thereafter, in the same manner as described above, the control unit 40 performs Steps S22 to S26, and selects and implements a next drive pattern DW. In this manner, in a case where the change in the lamp voltage Vla satisfies the switching condition when the drive pattern DW is implemented, the control unit 40 switches from the drive pattern DW that is presently selected, to any other drive pattern DW.

On the other hand, in a case where the present drive pattern DW does not satisfy the switching condition (NO in Step S28), the control unit 40 implements the drive pattern DW that is presently selected until the regular learning time has elapsed. Then, in a case where the regular learning time elapsed after the present drive pattern DW starts to be implemented (YES in Step S27), the voltage measurement unit of the operation detection unit 60 measures a lamp voltage Vla of the discharge lamp 90 (Step S29), and the control unit 40 stores the measured lamp voltage Vla in the storage unit 44. Thereafter, the control unit 40 evaluates the drive pattern DW that is presently selected (Step S30).

The evaluation of the drive pattern DW in Step S30, for example, is the same as the evaluation of the drive pattern DW in Step S17 during the initial learning duration. That is, the control unit 40 evaluates the drive pattern DW based on a value of the lamp voltage Vla that results after the selected drive pattern DW is implemented for the regular learning time, and on a difference of the lamp voltage Vla that results after the drive pattern DW is implemented for the regular learning time, with respect to the lamp voltage Vla that is available before the selected drive pattern DW is implemented. In the following description, a difference of the lamp voltage Vla that results after the drive pattern DW is implemented for the regular learning time, with respect to the lamp voltage Vla that is available before the drive pattern DW is implemented is referred to as a second change voltage value.

In Step S30, the control unit 40 makes a revaluation of the drive pattern DW that is selected during the regular learning duration. That is, the control unit 40 updates the evaluation of each drive pattern DW that is made during the initial learning duration, and the evaluation of each drive pattern DW that is made during the regular learning duration that is earlier than a present point in time.

Subsequently, the control unit 40 determines whether or not the drive pattern DW that is presently selected satisfies a successive implementation condition (a second given condition) (Step S31). The successive implementation condition includes a condition that any one of a first successive implementation condition, a second successive implementation condition, and a third successive implementation condition is satisfied. Each of the first successive implementation condition, the second successive implementation condition, and the third successive implementation condition includes a condition that the number of times of successive implementation is a given number of times, or less. Regarding the number of times of successive implementation, the given number of times, for example, is equal to or greater than 2 and is equal to smaller than 15.

Then, the first successive implementation condition is that the lamp voltage Vla which results after the selected drive the pattern DW is implemented for the regular learning time is higher than the target numerical value range and that the second change voltage value is a negative value. The second successive implementation condition is that the lamp voltage Vla which is available or results before or after the selected drive pattern DW is implemented is included in the target numerical value range. The third successive implementation condition is that the lamp voltage Vla which results after the selected drive pattern DW is implemented for the regular learning time is lower than the target numerical value range and that the second change voltage value is a positive value.

In a case where the present drive pattern DW satisfies the successive implementation condition (YES in Step S31), the control unit 40 determines that, in the present state of the discharge lamp 90, the drive pattern DW that is presently selected is the drive pattern DW that is not preferable for prolonging the life of the discharge lamp 90. Then, the control unit 40 reselects the drive pattern DW that is presently selected, as the drive pattern DW that will be next implemented (Step S32). Then, proceeding to Step S26 takes place, and the control unit 40 successively implements the drive pattern DW that is previously selected as the drive pattern DW to be lately implemented.

As described above, in a case where the change in the lamp voltage Vla that is available or results before or after the selected one drive pattern DW is implemented for the regular learning time satisfies the successive implementation condition, the control unit 40 in the present embodiment successively implements the same drive patterns DW.

On the other hand, in a case where a present drive pattern DW does not satisfy the successive implementation condition (NO in Step S31), the control unit 40 determines whether or not the drive patterns DW are selected and implemented a given number of times in Steps S22 to S26 (Step S33).

In a case where the drive pattern DW is not selected and implemented the given number of times (NO in Step S33), proceeding to Step S22 takes place and a reselection of the drive pattern DW is made. The given number of times relating to the selection and implementation of the drive pattern DW during the regular learning duration in one cycle, for example, is greater than the number N of the drive patterns DW.

In a case where the drive patterns DW are selected and implemented a given number of times (YES in Step S33), the control unit 40 ends one cycle of the regular learning duration (Step S34). The control unit 40 repeats one cycle, and thus continues the regular learning duration. The next one cycle is caused to start in a state where each parameter is taken over from the previous cycle of the regular learning duration, in addition to the number of times of the selection and implementation of the drive pattern DW being reset.

As described above, the control unit 40 performs the machine learning during the initial learning duration and the regular learning duration, and selects the drive pattern DW that is to be implemented. The initial learning duration, for example, is set to start one time after the projector 500 is lighted up for the first time. The regular learning duration, for example, is always provided after the initial learning duration is ended and while the projector 500 is lighted up. For example, when the projector 500 is powered off and then powered on, the control unit 40 resumes the duration that was in process when the projector 500 was powered off and restarts from a point at which the interruption occurs.

As described above, while performing the switching among the drive patterns DW based on the machine learning, the control unit 40 adjusts the drive electric power Wd that is to be supplied to the discharge lamp 90, in such a manner that an illumination level of the discharge lamp 90 is a target illumination level, based on illumination level information relating to the illumination level of the discharge lamp 90. The illumination level information in the present embodiment includes the lamp voltage Vla. That is, the control unit 40 in the present embodiment adjusts the drive electric power Wd in such a manner that the illumination level of the discharge lamp 90 is the target illumination level, based on the lamp voltage Vla.

In the following description, in some cases, description is provided using a target illumination level maintenance ratio LrT as a substitute for the target illumination level. The target illumination level maintenance ratio LrT is an illumination level maintenance ratio Lr that serves as a target. An illumination level maintenance ratio Lr is a ratio of a present illumination level of the discharge lamp 90 to an illumination level of the discharge lamp 90, which results when the discharge lamp 90 is lighted up for the first time.

Figure 12:
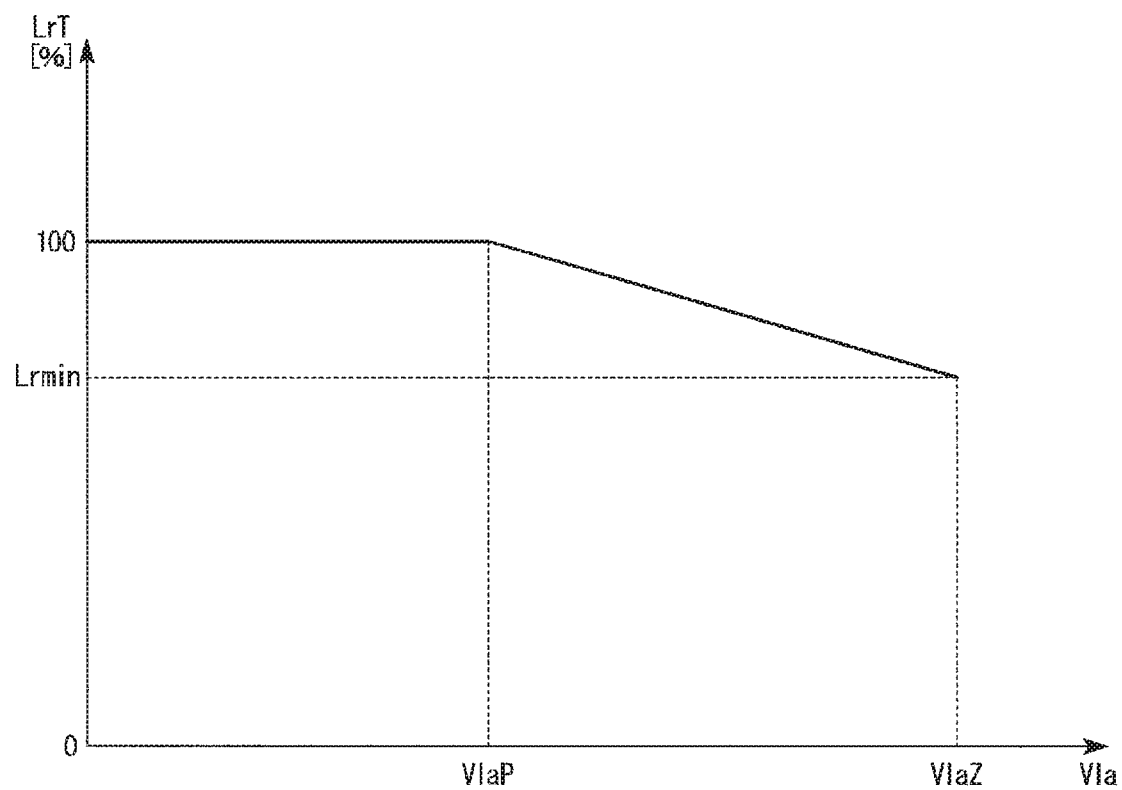
FIG. 12 is a graph representing a change in a target illumination level maintenance ratio with respect to a lamp voltage in the present embodiment.
Figure 13:
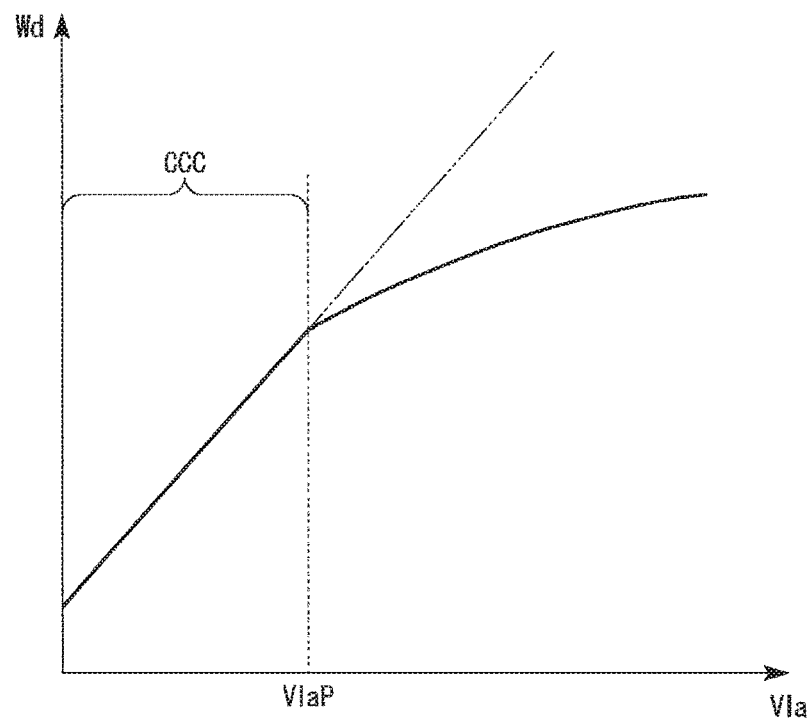
FIG. 13 is a graph representing a change in a drive electric power with respect to the lamp voltage in the present embodiment.

The control unit 40 in the present embodiment changes the target illumination level maintenance ratio LrT according to the lamp voltage Vla. FIG. 12 is a graph representing a change in the target illumination level maintenance ratio LrT with respect to the lamp voltage Vla in the present embodiment. In FIG. 12, the vertical axis represents the target illumination level maintenance ratio LrT [%], and the horizontal axis represents the lamp voltage Vla. FIG. 13 is a graph representing a change in the drive electric power Wd with respect to the lamp voltage Vla in the present embodiment. In FIG. 13, the vertical axis represents the drive electric power Wd, and the horizontal axis represents the lamp voltage Vla.

The control unit 40, as illustrated in FIG. 12, in a case where the lamp voltage Vla is below a given voltage value VlaP, the target illumination level maintenance ratio LrT is maintained as a constant value. In FIG. 12, in a case where the lamp voltage Vla is at or below the given voltage value VlaP, the control unit 40 maintains the target illumination level maintenance ratio LrT as being 100%. Because the target illumination level maintenance ratio LrT is maintained as constant, in a case where the lamp voltage Vla is at or below the given voltage value VlaP, the control unit 40 adjusts the drive electric power Wd in such a manner that the illumination level of the discharge lamp 90 (the illumination level maintenance ratio Lr) is maintained as constant, without depending on the lamp voltage Vla. Specifically, in a case where the lamp voltage Vla is below the given voltage value VlaP, the control unit 40 performs a constant electric current control CCC that supplies the drive electric current I whose electric current value is constant, to the discharge lamp 90, and thus maintains the illumination level of the discharge lamp 90 as constant. In the constant electric current control CCC, the control unit 40 increases the drive electric power Wd as the lamp voltage Vla increases. As illustrated in FIG. 13, the drive electric power Wd in the first constant electric current control CCC1 changes linearly with respect to the change in the lamp voltage Vla.

It is noted that, in the present embodiment, the electric current value of the drive electric current I being constant includes the electric current value being maintained in a given electric current range. The given electric current range, for example, is in a range of electric current values that account for plus and minus 10% of the electric current value which serves as a reference. Furthermore, in the present embodiment, if the lamp voltage Vla is at or below the given voltage value VlaP, the illumination level of the discharge lamp 90 is maintained as constant, without depending on the lamp voltage Vla. As examples of this, the illumination level of the discharge lamp 90 may be accordingly maintained as constant, when the value of the lamp voltage Vla changes in a given voltage value VlaP range or below, and the control unit 40 may perform a control that is based on a change in the value of the lamp voltage Vla, in order to maintain the illumination level of the discharge lamp 90 as constant. That is, in the present embodiment, the examples of the case where, if the lamp voltage Vla is at or below the given voltage value VlaP, the illumination level of the discharge lamp 90 is maintained as constant, without depending on the lamp voltage Vla include a case where the control unit 40 adjusts the drive electric power Wd based on the change in the value of the lamp voltage Vla and where the illumination level of the discharge lamp 90 is accordingly maintained as constant without depending on the value of the lamp voltage Vla. Specifically, in the present embodiment, in the constant electric current control CCC, the control unit 40 increases the drive electric power Wd with the increase in the lamp voltage Vla, and, as a result, the illumination level of the discharge lamp 90 is maintained as constant without depending on the value of the lamp voltage Vla.

The given voltage value VlaP, for example, is the value of the lamp voltage Vla in an initial stage for the discharge lamp 90. The given voltage value VlaP, for example, is the value of the lamp voltage Vla that results when the lighting-up of the discharge lamp 90 is stabilized after the discharge lamp 90 is lighted up for the first time. When the lighting-up of the discharge lamp 90 is stabilized after the discharge lamp 90 is lighted up for the first time, the control unit 40 measures the value of the lamp voltage Vla using the voltage measurement unit of the operation detection unit 60, and stores the measured value, as the given voltage value VlaP, in the storage unit 44. The given voltage value VlaP, for example, is 65 V or higher and is 70 V or lower.

On the other hand, in a case where the lamp voltage Vla is above the given voltage value VlaP, the control unit 40 adjusts the drive electric power Wd, which is to be supplied to the discharge lamp 90, based on the illumination level information relating to the illumination level of the discharge lamp 90. Specifically, as illustrated in FIGS. 12 and 13, in a case where the lamp voltage Vla is above the given voltage value VlaP, the control unit 40 changes an amount of the change in the drive electric power Wd with respect to an amount of the increase in the lamp voltage Vla, and thus decreases the target illumination level maintenance ratio LrT according to the increase in the lamp voltage Vla. Because the target illumination level maintenance ratio LrT decreases, in a case where the illumination level maintenance ratio Lr for the discharge lamp 90 continues to be maintained as the target illumination level maintenance ratio LrT, the illumination level of the discharge lamp 90 decreases. That is, in a case where the lamp voltage Vla is above the given voltage value VlaP, the control unit 40 accordingly lowers the illumination level of the discharge lamp 90 according to the increase in the lamp voltage Vla.

In a case where the lamp voltage Vla is above the given voltage value VlaP, an amount of the change in the target illumination level maintenance ratio LrT that decreases with respect to an increases of 1 V in the lamp voltage Vla is approximately 1% or more and approximately 3% or less. In the present embodiment, in a case where the lamp voltage Vla is above the given voltage value VlaP, the target illumination level maintenance ratio LrT changes linearly with respect to the lamp voltage Vla. Accordingly, in a case where the lamp voltage Vla is above the given voltage value VlaP, the amount of the change in the target illumination level maintenance ratio LrT that decreases with respect to the increases of 1 V in the lamp voltage Vla is constant.

Because the target illumination level maintenance ratio LrT changes in this manner, in a case where the illumination level maintenance ratio Lr for the discharge lamp 90 continues to be maintained as the target illumination level maintenance ratio LrT, the illumination level of the discharge lamp 90 is lowered by an constant amount of change each time the lamp voltage Vla increases by 1 V. That is, in the case where the lamp voltage Vla is above the given voltage value VlaP, the control unit 40 lowers the illumination level of the discharge lamp 90 by a given amount of change with respect to the amount of the increase in the lamp voltage Vla.

In a case where the lamp voltage Vla is above the given voltage value VlaP, the control unit 40 decreases the target illumination level maintenance ratio LrT according to the increase in the lamp voltage Vla until the life of the discharge lamp 90 terminates. The life of the discharge lamp 90, for example, is equivalent to an accumulated lighting time that the illumination level maintenance ratio Lr takes to reach the limit value Lrmin. A limit value Lrmin is a value of the illumination level maintenance ratio Lr, at which the ability to withstand the use of the discharge lamp 90 is limited. The limit value Lrmin, for example, is 50% or more and 90% less. The target illumination level maintenance ratio LrT decreases linearly according to the increase in the lamp voltage Vla, from 100% to the limit value Lrmin. The lamp voltage Vla that results when the target illumination level maintenance ratio LrT is at the limit value Lrmin is a limit voltage value VlaZ. The limit voltage value VlaZ is a maximum value of the lamp voltage Vla until the life of the discharge lamp 90 terminates.

In a case where, as described above, the illumination level of the discharge lamp 90 (the target illumination level maintenance ratio LrT) is lowered according to the increase in the lamp voltage Vla, the drive electric power Wd, as illustrated in FIG. 13, for example, changes linearly with respect to the change in the lamp voltage Vla. Specifically, in a case where the lamp voltage Vla is above the given voltage value VlaP, the amount of the change in the drive electric power Wd with respect to the amount of the increase in the lamp voltage Vla is smaller than the amount of the change in the drive electric power Wd (the amount of the change in the drive electric power Wd with respect to the amount of the increase in the lamp voltage Vla in the constant electric current control CCC) with respect to the amount of the increase in the lamp voltage Vla in a case where the lamp voltage Vla is at or below the given voltage value VlaP. Moreover, the higher the lamp voltage Vla, the more gradual a slope (an amount of change) of the change in the drive electric power Wd with respect to the lamp voltage Vla.

It is noted that in the present embodiment, it is preferable that the given voltage value VlaP is the value of the lamp voltage Vla that is available before the drive electric power Wd reaches a rating electric power for the discharge lamp 90 in the constant electric current control CCC. That is, before the drive electric power Wd increases with the increase in the lamp voltage Vla and reaches the rating electric power for the discharge lamp 90 in the constant electric current control CCC, the control unit 40 ends the constant electric current control CCC and decreases the amount of the change in the drive electric power Wd with respect to the amount of the increase in the lamp voltage Vla.

Furthermore, in the present embodiment, it is assumed that the illumination level maintenance ratio Lr for the discharge lamp 90 changes in the same manner as the target illumination level maintenance ratio LrT that is illustrated in FIG. 12.

The discharge lamp lighting device 10 that includes the control unit 40 which performs the controls described above can also be expressed as a discharge lamp drive method. That is, according to an aspect of the present embodiment, there is provided a discharge lamp drive method in which drive electric current I is supplied to a discharge lamp 90 that includes a first electrode 92 and a second electrode 93 and thus the discharge lamp 90 is driven, the method including: selecting any one drive pattern DW from among a plurality of drive patterns DW of the drive electric current I, based on machine learning and implementing the selected drive pattern DW; and adjusting a drive electric power Wd that is to be supplied to the discharge lamp 90, based on illumination level information relating to an illumination level of the discharge lamp 90, in a case where a lamp voltage Vla of the discharge lamp 90 is above a given voltage value VlaP.

For example, because the drive pattern DW is set in advance according to the value of the lamp voltage Vla and a value of the drive electric power Wd in the related art, in a case where the lamp voltage Vla and the drive electric power Wd are the same, the drive pattern DW that is to be implemented is one drive pattern DW that is set in advance.

In contrast, in the present embodiment, because the drive pattern DW is selected with the machine learning, for example, in a case where the lamp voltage Vla is at a given voltage value and the drive electric power Wd is at a given electric power value, the plurality of drive patterns DW that are different from each other in terms of at least one drive parameter are implemented. That is, for example, in a case where the drive electric power Wd, which is to be supplied to the discharge lamp 90, is in a given electric power band and where the lamp voltage Vla of the discharge lamp 90 is at a given voltage value, the control unit 40 implements at least three drive patterns DW. The at least three drive patterns DW are drive patterns DW that are different from each other in terms of a value of at least one drive parameter, among a plurality of drive parameters in a drive that constitutes one drive pattern DW. That is, in a case where the lamp voltage Vla is set to be constant and where the drive pattern DW of the drive electric current I that is to be supplied to the discharge lamp 90 is detected, with an electric power band of the drive electric power Wd being set to be constant, it is possible that at least three or more different drive patterns DW are detected. It is noted that the given electric power band, for example, is a range of numerical values of the drive electric power Wd that is approximately 10 W in width.

Furthermore, as described above, when the drive pattern DW is selected and implemented with machine learning, in a case where the lamp voltage Vla of the discharge lamp 90 is at a given voltage value, there is a difference in an accumulated lighting time for the discharge lamp 90 or an individual that is the discharge lamp 90 and thus there is a difference in the drive pattern DW that is selected and implemented. That is, in a case where the lamp voltage Vla of the discharge lamp 90 is at a given voltage value, the control unit 40 implements at least two drive patterns DW, for example, a first drive pattern and a second drive pattern, according to at least one of the accumulated lighting time for the discharge lamp 90 and an individual that is the discharge lamp 90.

The first drive pattern and the second drive pattern are any two drive patterns DW among a plurality of drive patterns DW. The first drive pattern and the second drive pattern are different from each other in terms of a value of at least one drive parameter among a plurality of drive parameters in the drive that constitutes each drive pattern. It is noted that the accumulated lighting time is a total of times for which the discharge lamp 90 is lighted up. That is, the accumulated lighting time is a time that results from accumulating the times for which the discharge lamp 90 has been lighted up since the discharge lamp 90 was lighted up for the first time.

Specifically, for example, in a case where the lamp voltage Vla is at a given voltage value and where the accumulated lighting time is a first accumulated lighting time, the control unit 40 implements the first drive pattern. Furthermore, in a case where the lamp voltage Vla is at the given voltage value and where the accumulated lighting time is a second accumulated lighting time, which is different from the first accumulated lighting time, the control unit 40 implements the second drive pattern. That is, in a case where the drive pattern DW of the drive electric current I, which is to be supplied to the discharge lamp 90, is detected with the lamp voltage Vla being constant, when the accumulated lighting time for the discharge lamp 90 changes, it is possible that at least two or more drive patterns DW are detected.

Furthermore, for example, in a case where the lamp voltage Vla is at a given voltage value and where the discharge lamp 90 is a first individual, the control unit 40 performs the first drive pattern. Furthermore, in a case where the lamp voltage Vla is at the given voltage value and where the discharge lamp 90 is a second individual, which is different from the first individual, the control unit 40 performs the second drive pattern. That is, in the case where the drive pattern DW of the drive electric current I, which is to be supplied to the discharge lamp 90, is detected with the lamp voltage Vla being constant, when an individual that is the discharge lamp 90 changes, it is possible that at least two or more drive patterns DW are detected.

It is noted that the case where there is a difference in a value of at least one drive parameter among a plurality of drive parameters includes a case where there is a difference between two drive patterns DW in terms of the drive that constitute each drive pattern DW. More specifically, for example, the first drive pattern and the second drive pattern are also set to be drive patterns DW that are different from each other in terms of a value of at least one drive pattern, in a case where the first drive pattern is configured with the alternating current drive and the second drive pattern is configured with the direct current drive and alternating current drive, and where each drive parameter relating to the alternating current drive in the first drive pattern and each drive parameter relating to the alternating current drive in the second drive pattern are the same. In this case, because the direct current drive is not included in the first drive pattern, the drive parameter relating to the direct current drive in the first drive pattern is zero. Accordingly, the first drive pattern and the second drive pattern in this case are different from each other in terms of the drive parameter relating to the direct current drive.

According to the present embodiment, as described above, the control unit 40 selects any one drive pattern DW from among a plurality of drive patterns DW, based on the machine learning, and implements the selected drive pattern DW. For this reason, even in a case where there is an individual difference of the discharge lamp 90, a suitable drive pattern DW can be selected according to the individual difference of the discharge lamp 90 by performing the machine learning. Therefore, according to the present embodiment, the life of the discharge lamp 90 can be prolonged without depending on the individual difference of the discharge lamp 90.

Furthermore, when the drive electric power Wd that is to be supplied to the discharge lamp 90 changes, the degree of melting of, and the degree of growth, of the protrusion 552$p$ of the first electrode 92 change. For this reason, in the related art, there is a need to determine the drive patterns DW suitable for the drive electric current I that is to be supplied to the discharge lamp 90, according to the lamp voltage Vla, for each drive electric power Wd that is to be supplied to the discharge lamp 90, and to store the determined drive pattern DW in the storage unit 44. Therefore, there is provided a specification in which the drive pattern DW is difficult to set according to the lamp voltage Vla for each of all the drive electric powers Wd and in which the drive electric power Wd that is to be supplied to the discharge lamp 90 cannot be changed except for a plurality of drive electric powers Wd that are determined set in advance.

In contrast, according to the present embodiment, because the drive pattern DW is selected based on the machine learning, even in a case where the drive electric power Wd is changed, a suitable drive pattern DW can be selected according to the change in the drive electric power Wd. Accordingly, it is possible that the drive electric power Wd, which is to be supplied to the discharge lamp 90, is easily changed in a stepwise manner. Therefore, for example, it is possible that a user voluntarily changes the drive electric power Wd and thus freely changes the luminance of an image that is projected from the projector 500. For this reason, for example, it is also possible that the drive electric power Wd is decreased to a relatively low level and thus the life of the discharge lamp 90 is prolonged while power consumption by the projector 500 is suppressed.

Furthermore, because it is possible that the drive electric power Wd is voluntarily changed, it is also possible that the drive electric power Wd is used as one drive parameter of the drive pattern DW that is changed when prolonging the life of the discharge lamp 90. Accordingly, the life of the discharge lamp 90 can be more prolonged. For example, an operation unit for changing the drive electric power Wd may be provided on the casing of the projector 500.

Furthermore, according to the present embodiment, the control unit 40 makes a selection of the drive pattern DW based on the change in the lamp voltage Vla. For this reason, the lamp voltage Vla is measured, and thus the selection of the drive pattern DW can be made and the machine learning can be performed suitably and easily.

Furthermore, according to the present embodiment, in a case where the change in the lamp voltage Vla that is measured satisfies the switching condition when the selected drive pattern DW is implemented, the control unit 40 performs the switching from the selected drive pattern DW to any other drive pattern DW. For this reason, in a case where the selected drive pattern DW is the drive pattern DW that is not preferable for prolonging the life of the discharge lamp 90 in comparison with the state thereof, the switching from the drive pattern DW to any other suitable drive pattern DW may take place. Therefore, the life of the discharge lamp 90 can be suppressed from being decreased.

Furthermore, as described above, the result of the evaluation of the drive pattern DW that satisfies the switching condition is set to be a low level, and the drive pattern DW that satisfies the switching condition in the second place is selected in Step S24. When it is determined in Step S25 whether or not the drive pattern DW that satisfies the switching condition satisfies the implementation condition, it is determined that the implementation condition is not satisfied. That is, the control unit 40 does not implement the drive pattern DW that satisfies the switching condition during a given duration. For this reason, according to the present embodiment, the drive pattern DW that has a high likelihood of decreasing the life of the discharge lamp 90 can be suppressed from being implemented, and the life of the discharge lamp 90 can be more prolonged.

As described above, in a case where the regular learning time elapsed from the selected drive pattern DW starts to be implemented, the control unit 40 selects the next drive pattern DW. Because of this, a length of the time for implementing the drive pattern DW is basically the same as the length of the regular learning time. However, in some cases, due to the state of the discharge lamp 90, the switching from the drive pattern DW that is selected during the regular learning duration to any other drive pattern DW is performed on the way before the regular learning time elapsed. Because of this, even in the case of the same drive pattern DW, in some cases, the time for implementing the selected one drive pattern DW changes from when one drive pattern DW starts to be implemented to when the switching to the next drive pattern DW takes pace.

That is, based on the lamp voltage Vla, the control unit 40 changes a length of the time for implementing a given drive pattern DW, among a plurality of drive patterns DW. For this reason, according to the change in the lamp voltage Vla, the switching to a suitable drive pattern DW can take place, and thus the life of the discharge lamp 90 can be more prolonged.

Furthermore, the length of the time for implementing the given drive pattern DW, among the plurality of drive patterns DW, changes as described above, and because of this, changes according to the accumulated lighting time for the discharge lamp 90. Furthermore, the length of the time for implementing the given drive pattern DW, among the plurality of drive patterns DW, changes as described above, and because of this, changes according to an individual that is the discharge lamp 90. In a case where the switching from the selected drive pattern DW to any other drive pattern DW is performed on the way, the time for implementing the selected drive pattern DW is shorter than the regular learning time.

Furthermore, for example, even in the case of the drive pattern DW that has the highest level of the result of the evaluation, that is, the drive pattern DW that causes the lamp voltage Vla of the discharge lamp 90 to be the closest to the target numerical value range, if the same drive pattern DW is always implemented, in some cases, it is difficult for the protrusion 552*p* of the first electrode 92 to grow, and in other cases, the life of the discharge lamp 90 is difficult to sufficiently prolong. Furthermore, for example, the degree of the melting of the protrusion 552*p* of the first electrode 92 of the discharge lamp 90 changes with a degradation in the discharge lamp 90, that is, an increase in the accumulated lighting time. For this reason, in some cases, a drive pattern DW, although suitable for prolonging the life of the discharge lamp 90 at a certain point in time, is not suitable for prolonging the life of the discharge lamp 90 at any other point in time.

In contrast, according to the present embodiment, in one cycle of the regular learning duration, the control unit 40 selects and implements the higher one of the drive pattern DW that is not selected from among N drive patterns DW and the drive patterns DW that have a relatively high level of the result of the evaluation. For this reason, in one cycle, both each of the drive patterns DW that have a relatively high level of the result of the evaluation, which include the drive pattern DW that has the highest level of the result of the evaluation, and any other drive pattern DW are simultaneously implemented. That is, during a constant duration, the control unit 40 according to the present embodiment implements both each of the drive patterns DW (hereinafter referred to as a high-level evaluation-result drive pattern DWm) that have a relatively high level of the result of the evaluation, which include the drive pattern DW that has the highest level of the result of the evaluation, among a plurality of drive patterns DW, and the drive pattern DW (hereinafter referred to as any other drive pattern DWe) that has a lower level of the result of the evaluation than the high-level evaluation-result drive pattern DWm, among the plurality of drive patterns DW. Accordingly, any other drive pattern DWe that has a lower level of the result of the evaluation than the high-level evaluation-result drive pattern DWm, among the high-level evaluation-result drive patterns DWm that have a high level of the result of the evaluation, can be implemented, and stimulus, such as thermal load that is applied to the first electrode 92, is easy to greatly change. Therefore, the protrusion 552*p* is easily caused to grow, and the life of the discharge lamp 90 is easy to prolong.

Furthermore, according to the present embodiment, in a case where the change in the lamp voltage Vla that is available or results before or after the selected one drive pattern DW is implemented satisfies the successive implementation condition, the control unit 40 successively implements the selected drive pattern DW a plurality of times. At this point, according to the present embodiment, in the case where the lamp voltage Vla is at a given voltage value and the drive electric power Wd is at a given electric power value, a configuration is employed in which the plurality of drive patterns DW that are different from each other in terms of at least one drive parameter are implemented. That is, according to the present embodiment, a randomness property in which one drive pattern is selected under one condition from among two or more drive patterns DW is provided, and on the other hand, a property in which, in a case where the selected drive pattern DW satisfies the successive implementation condition, one same drive pattern is successively implemented is also provided. For this reason, the drive pattern DW suitable for prolonging the life of the discharge lamp 90 can be successively implemented a plurality of times and the life of the discharge lamp 90 is easy to prolong more. Furthermore, the successive implementation condition in the present embodiment includes a condition that the number of times of successive implementation is a given number of times or less. For this reason, for the implementation time for which the drive pattern DW is implemented by the degree to which the state of the discharge lamp 90 is not greatly changed, a suitable drive pattern DW can be successively implemented a plurality of times. Therefore, the life of the discharge lamp 90 is easy to prolong more.

Furthermore, according to the present embodiment, the control unit 40 determines whether or not the implementation condition is satisfied as illustrated in Step S25, and, in a case where the implementation condition is not satisfied, does not implement the drive pattern DW. Accordingly, the drive pattern DW that has a relatively low level of the result of the evaluation is difficult to implement. Therefore, the life of the discharge lamp 90 is easy to prolong more.

Because the drive pattern DW is selected and implemented based on the machine learning as described above, in the present embodiment, the probabilities that the drive pattern DW will be implemented are different from each other without depending on the lamp voltage Vla. That is, in a case where the lamp voltage Vla of the discharge lamp 90 is at a given value, a probability that the first drive pattern will be implemented and a probability that the second drive pattern will be implemented are different from each other.

Furthermore, during an implementation duration during which each of at least the first drive pattern and the second drive pattern is implemented one or more times, a ratio of the implementation time for implementing the first drive pattern to a length of the implementation duration, and a ratio of the implementation time for implementing the second drive pattern to the length of the implementation duration are different from each other. The implementation duration, for example, is equivalent to one cycle of the regular learning duration.

During the implementation duration during which each of at least the first drive pattern and the second drive pattern is implemented, that is, for example, in one cycle of the regular learning duration, the number of times that the first drive pattern is implemented and the number of times that the second drive pattern is implemented are different from each other. In a case where the first drive pattern is set to be each of the high-level evaluation-result drive patterns DWm that include the drive pattern DW which has the highest level of the result of the evaluation, and where the second drive pattern is set to be one drive pattern DW among any other drive patterns DWe, the number of times that the first drive pattern is implemented is greater than the number of times that the second drive pattern is implemented.

Furthermore, for example, when the number N of the plurality of selected drive patterns DW is too small, in some cases, a suitable drive pattern DW in accordance with the state of the discharge lamp 90 is not included. On the other hand, when the number of drive patterns DW is too great, the initial learning duration is lengthened, and it takes time to select the suitable drive pattern DW. Furthermore, during the regular learning duration, a ratio in which the drive pattern DW other than the suitable drive pattern DW is implemented increases.

In contrast, if the number of drive patterns DW is equal to or greater than 10 and is equal to or smaller than 100, the suitable drive pattern DW in accordance with the state of the discharge lamp 90 is easy to select, and the length of the initial learning duration can also be shortened. Furthermore, during the regular learning duration, because a ratio of the suitable drive patterns DW can be increased, the life of the discharge lamp 90 can be more prolonged. Furthermore, if the number of drive patterns DW is equal to or greater than 20, and is equal to smaller than 30, more effects of this type can be achieved.

Furthermore, for example, in a case where the drive electric power Wd continues to be maintained as constant, the illumination level maintenance ratio Lr is lowered as the accumulated lighting time for the discharge lamp 90 increases. The reason for this is as follows. When the accumulated lighting time increases, the lamp voltage Vla increases. For this reason, in a case where the drive electric power Wd is constant, an amount of drive electric current I that is to be supplied to the discharge lamp 90 decreases. Accordingly, a plasma dentistry due to the arc discharge decreases, and the illumination level of the discharge lamp 90 is lowered. Therefore, as the accumulated lighting time increases, the illumination level maintenance ratio Lr decreases. For this reason, a duration during which an initial illumination level maintenance ratio Lr for the discharge lamp 90 is maintained is easily shortened, and a duration for use in a state where the illumination level maintenance ratio Lr for the discharge lamp 90 is relatively low is easily lengthened. Furthermore, a user who uses the discharge lamp 90 is made to recognize that, as the discharge lamp 90 continues to be used, the illumination level (the brightness) of the discharge lamp 90 decreases. Accordingly, in some cases, the comfortableness for the user cannot be sufficiently improved. Specifically, in a case where, as in the present embodiment, the discharge lamp 90 is mounted in the projector 500, the duration for use in a state where the luminance of the image that is projected from the projector 500 is relatively low is easily lengthened.

In contrast, according to the present embodiment, in a case where the lamp voltage Vla is above the given voltage value VlaP, the control unit 40 adjusts the drive electric power Wd, which is to be supplied to the discharge lamp 90, based on the illumination level information relating to the illumination level of the discharge lamp 90. For this reason, in a case where the lamp voltage Vla increases, the drive electric power Wd is increased, and thus the illumination level of the discharge lamp 90 can be suppressed from being lowered. Accordingly, the duration for use in a state where the illumination level maintenance ratio Lr of the discharge lamp is relatively high can be easily extended, and the comfortableness for the user can be improved.

Furthermore, in a case where the drive electric power Wd is maintained as constant, when the lamp voltage Vla increases, the amount of the drive electric current I that is to be supplied to the discharge lamp 90 decreases. Because of this, in some cases, the thermal load that is applied to the first electrode 92 and the second electrode 93 decreases and it is difficult for the protrusions 552p and 562p to grow. In contrast, according to the present embodiment, the drive electric power Wd can be adjusted according to the illumination level of the discharge lamp 90. Because of this, a value of the drive electric current I can be maintained, and the thermal load that is applied to the first electrode 92 and the second electrode 93 can be suppressed from decreasing. Therefore, sufficient thermal load is easy to apply to the first electrode 92 and the second electrode 93, and the protrusions 552p and 562p are easily caused to grow. As a result, the life of the discharge lamp 90 can be prolonged. Furthermore, as described above, although the drive electric power Wd is changed in this manner based on the change in the lamp voltage Vla, the life of the discharge lamp 90 can be suppressed from decreasing, by using the machine learning.

Furthermore, for example, in a case where the drive electric power Wd is adjusted and the illumination level of the discharge lamp 90 continues to be maintained at an initial illumination level, that is, in a case where the target illumination level maintenance ratio LrT for the discharge lamp 90 is maintained as being 100%, in some cases, the more the lamp voltage Vla increases, the more increased the drive electric power Wd continues to be and the more excessive load is applied to the discharge lamp 90. For this reason, in some cases, the lift of the discharge lamp 90 is decreased.

In contrast, according to the present embodiment, in a case where the lamp voltage Vla is above the given voltage value VlaP, the control unit 40 decreases the target illumination level maintenance ratio LrT according to the increase in the lamp voltage Vla. For this reason, in a case where the lamp voltage Vla is above the given voltage value VlaP, the control unit 40 accordingly lowers the illumination level of the discharge lamp 90 according to the increase in the lamp voltage Vla. Accordingly, in a case where the lamp voltage Vla is above the given voltage value VlaP, the drive electric power Wd that is to be supplied to the discharge lamp 90 decreases compared with a case where the illumination level maintenance ratio Lr is adjusted to the target illumination level maintenance ratio LrT (for example, 100%) as in the case where the lamp voltage Vla is at or below the given voltage value VlaP.

For example, in a case where the lamp voltage Vla is at or above the given voltage value VlaP, a straight line that is illustrated as a two-dot chain line in FIG. 13 indicates the change in the drive electric power Wd in a case where the constant electric current control CCC is performed. As indicated by a solid line in FIG. 13, according to the present embodiment, in a case where the lamp voltage Vla is at or above the given voltage value VlaP, although the constant electric current control CCC is performed, the value of the drive electric power Wd can be decreased.

As described above, according to the present embodiment, in a case where the lamp voltage Vla is above the given voltage value VlaP, the drive electric power Wd can be decreased. Because of this, it is difficult for a load on the discharge lamp 90 to increase excessively, and the life of the discharge lamp 90 can be suppressed from being decreased. As a result, the discharge lamp 90 that is capable of maintaining the illumination level of the discharge lamp 90 at a relatively high value is realized for a relatively long duration.

Furthermore, the degree of lowering in the illumination level of the discharge lamp 90 with respect to the amount of the increase in the lamp voltage Vla is sufficiently decreased, and this makes it difficult for the user to notice a change in the illumination level of the discharge lamp 90. Accordingly, the comfortableness for the user can be suppressed from decreasing. Specifically, an amount of the decrease in the illumination level maintenance ratio Lr for the discharge lamp 90 in a case where the lamp voltage Vla increases by 1 V is set to 3% or less, and this makes it suitably difficult for the user to notice the change in the illumination level of the discharge lamp 90.

Furthermore, the value of the drive electric power Wd decreases and the load on the discharge lamp 90 is reduced. Thus, the protrusions 552*p* and 562*p* of the first electrode 92 and the second electrode 93 easily grow, and the lamp voltage Vla easily decreases. As a result, the lamp voltage Vla repeats the behavior of exceeding the given voltage value VlaP and then falling back to or below the given voltage value VlaP, and is maintained in the vicinity of the given voltage value VlaP. Accordingly, the lamp voltage Vla can be suppressed from increasing, and while the drive electric power Wd is suppressed to a relatively low degree, the illumination level of the discharge lamp 90 can be maintained. Therefore, the life of the discharge lamp 90 can be prolonged.

Furthermore, according to the present embodiment, in a case where the lamp voltage Vla is above the given voltage value VlaP, the control unit 40 decreases the target illumination level maintenance ratio LrT by a given amount of change with respect to the amount of the increase in the lamp voltage Vla. For this reason, in the case where the lamp voltage Vla is above the given voltage value VlaP, the control unit 40 accordingly lowers the illumination level of the discharge lamp 90 by a given amount of change with respect to the amount of the increase in the lamp voltage Vla. Accordingly, in a case where the lamp voltage Vla continues to increase, the illumination level of the discharge lamp 90 can be gradually decreased to a constant degree. Therefore, the user has difficulty noticing the change in the illumination level of the discharge lamp 90, and the comfortableness for the user can be more suppressed from decreasing.

Furthermore, according to the present embodiment, in a case where the lamp voltage Vla is at or below the given voltage value VlaP, the control unit 40 adjusts the drive electric power Wd in such a manner that the illumination level of the discharge lamp 90 is maintained as constant without depending on the lamp voltage Vla. For this reason, the comfortableness for the user can be improved. Furthermore, in a case where the lamp voltage Vla is at or below the given voltage value VlaP, the illumination level of the discharge lamp 90 can be maintained in a range where the value of the drive electric power Wd is relatively low. Accordingly, while the load on the discharge lamp 90 is decreased to a relatively low degree, the illumination level of the discharge lamp 90 can be maintained. Therefore, the life of the discharge lamp 90 can be more suppressed from being decreased.

Furthermore, according to the present embodiment, because the lamp voltage Vla is easy to maintain as a suitable value, for example, a value in the vicinity of the given voltage value VlaP using the machine learning, a duration during which the illumination level maintenance ratio Lr is maintained being 100% can be extended, and the comfortableness for the user can be more improved.

Furthermore, according to the present embodiment, in a case where the lamp voltage Vla is at or below the given voltage value VlaP, the control unit 40 supplies the drive electric current I whose electric current value is constant to the discharge lamp 90. Accordingly, the illumination level of the discharge lamp 90 can be maintained as constant.

It is noted that in the present embodiment, the following configurations and methods can be employed.

As long as the control unit 40 selects and implements the drive pattern DW based on the machine learning, a machine learning method is not particularly limited. A method of evaluating the drive pattern DW described above is not particularly limited. The initial learning time and the regular learning time may be different from each other.

Furthermore, in a case where the lamp voltage Vla drops to a third given value or higher, the control unit 40 may perform the switching from the drive pattern DW to the drive pattern DW that is previously implemented. More specifically, for example, when the selected one drive pattern DW is implemented, the control unit 40 determines whether or not the lamp voltage Vla drops to the third given value or higher, based on the lamp voltage Vla that is measured within the regular learning time, and, in a case where the lamp voltage Vla drops to the third given value or higher, performs the switching to the drive pattern DW that is previously implemented. With this configuration, for example, in a case where the protrusion 552*p* moves and the lamp voltage Vla drops abruptly, the switching to the drive pattern DW that is available before the protrusion 552*p* moves can be performed. Accordingly, a change from a position of the protrusion 552*p* to a pre-movement position is easily made. Furthermore, in the case where the lamp voltage Vla drops to the third given value or higher, the control unit 40 may perform the switching from the drive pattern DW to the drive pattern DW that is different from the drive pattern DW which is previously implemented.

Furthermore, based on the lamp voltage Vla, the control unit 40 may change the length of the regular learning time. For example, when the discharge lamp 90 is degraded, in some cases, the time that the change in the lamp voltage Vla due to the drive pattern DW to take place is lengthened. In this case, when the time for implementing the drive pattern DW is short, in some cases, the drive pattern DW can be suitably evaluated. In contrast, the length of the regular learning time is changed based on the lamp voltage Vla, and thus the regular learning time can be lengthened in a case where the discharge lamp 90 is degraded and the time for implementing the drive pattern DW can be lengthened. Therefore, the drive pattern DW is easy to evaluate suitably, and as a result, the life of the discharge lamp 90 can be prolonged.

Furthermore, based on the lamp voltage Vla, the control unit 40 may change the number of drive patterns DW and may change a type of drive parameter in each drive that constitutes the drive pattern DW. In these cases, based on the lamp voltage Vla, the control unit 40 may change the number of types of drive parameters that are different from each other among a plurality of the drive patterns DW. For example, in a case where the lamp voltage Vla is higher than a first voltage, the control unit 40 may increase the number of types of drive parameters that are different from each other among the plurality of drive patterns DW. With this configuration, in a case where the discharge lamp 90 is degraded, an increase in stimulus due to a change in the thermal load that is applied to the first electrode 92 can be easily caused, and the life of the discharge lamp 90 can be much more prolonged.

Furthermore, based on the change in the immediately-preceding lamp voltage Vla, the control unit 40 may select the drive pattern DW. Furthermore, the control unit 40 may implement all drive patterns DW necessarily one time for each drive pattern DW in one cycle of the regular learning duration. Furthermore, the control unit 40 may create a drive pattern DW other than a plurality of drive patterns DW that are set in advance during the regular learning duration. In this case, based on an evaluation value of each drive pattern DW that is set in advance, the control unit 40 may create a new drive pattern DW by combining drive parameters.

Furthermore, in Step S15 during the initial learning duration, as in Step S28 during the regular learning duration, the control unit 40 may determine whether or not the drive pattern DW that is presently selected satisfies the switching condition. For example, in a case where the drive pattern DW that is presently selected satisfies the switching condition, the control unit 40 may set the result of the evaluation of the drive pattern DW that is presently selected, to be at a low level, and may perform the switching from the drive pattern DW that is presently selected to any other drive pattern DW. On the other hand, in a case where the drive pattern DW that is presently selected does not satisfy the switching condition, the control unit 40 may implement the drive pattern DW that is presently selected, until the initial learning time has elapsed. It is noted that the switching condition in this case may be the same as or different from the switching condition in Step S28.

Figure 14A:
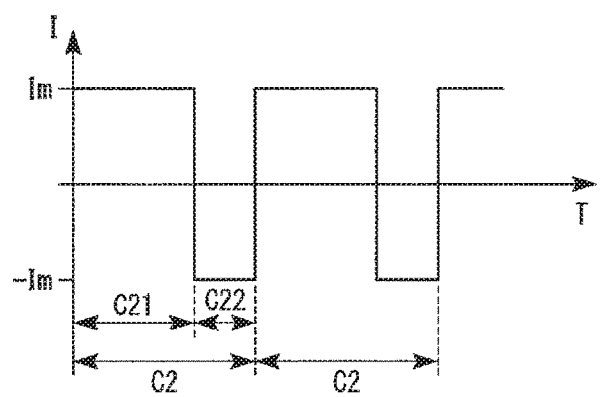
FIG. 14A is a diagram illustrating an example of the drive electric current waveform that is supplied to the discharge lamp in a shift drive according to the present embodiment.
Figure 14B:
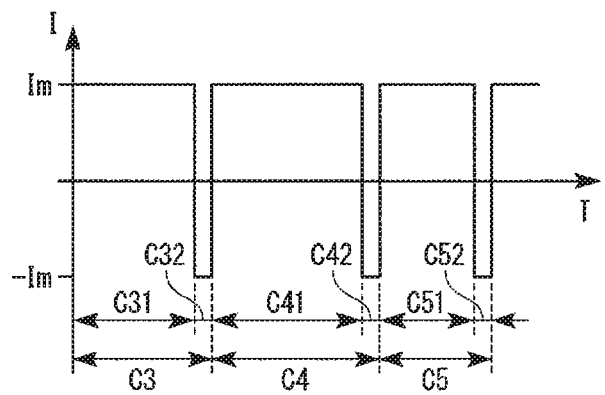
FIG. 14B is a diagram illustrating an example of the drive electric current waveform that is supplied to the discharge lamp in the shift drive according to the present embodiment.
Figure 15:
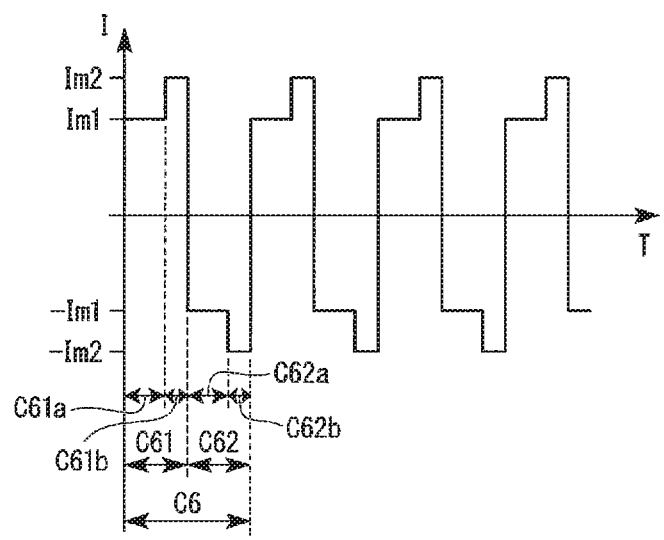
FIG. 15 is a diagram illustrating an example of the drive electric current waveform that is supplied to the discharge lamp in a leap drive according to the present embodiment.

Furthermore, the drive electric current waveform of the drive pattern DW is not particularly limited. For example, the drive electric current waveforms of the drive pattern DW may include drive electric current waveforms that are illustrated in FIGS. 14A, 14B, and 15. FIGS. 14A, 14B, and 15 are diagrams, each illustrating another example of the drive electric current waveform that is to be supplied to the discharge lamp 90 in the alternating current drive. In FIGS. 14A, 14B, and 15, the vertical axis represents the drive electric current I, and the horizontal axis represents time T. It is illustrated that the drive electric current I is set to be positive in the case of the first polarity state and is set to be negative in the case of the second polarity state.

Each of the alternating current drives that are illustrated in FIGS. 14A and 14B is a shift drive that has a duty ratio of smaller than 0.5 (50%). The drive electric current I that is supplied to the discharge lamp 90 in the shift drive that is illustrated in FIGS. 14A and 14B, for example, is rectangular-wave alternating electric current of which a polarity is inverted a plurality of times between the electric current value Im and the electric current value −Im.

In the shift drive in FIG. 14A, a length of periodicity C2 is constant. At the periodicity C2, a first polarity duration C21 that is the first polarity state, and a second polarity duration C22 that is the second polarity state are provided. A length of the first polarity duration C21 is longer than a length of the second polarity duration C22. That is, the shift drive that is illustrated in FIG. 14A has a periodicity, a length of the periodicity C2, a duty ratio, a length of the first polarity duration C21, and a length of the second polarity duration C22, as drive parameters.

In the shift drive that is illustrated in FIG. 14B, a length of a periodicity changes. In an example in FIG. 14B, a first periodicity C3, a second periodicity C4, and a third periodicity C5 are provided. A length of the first periodicity C3 is longer than a length of the third periodicity C5. A length of the second periodicity C4 is longer than a length of the first periodicity C3.

At the first periodicity C3, a first polarity duration C31 that is the first polarity state and a second polarity duration C32 that is the second polarity state are provided. A length of the second polarity duration C32 is shorter than a length of the first polarity duration C31. At the second periodicity C4, a first polarity duration C41 that is the first polarity state and a second polarity duration C42 that is the second polarity state are provided. A length of the second polarity duration C42 is shorter than a length of the first polarity duration C41. At the third periodicity C5, a first polarity duration C51 that is the first polarity state and a second polarity duration C52 that is the second polarity state are provided. A length of the second polarity duration C52 is shorter than a length of the first polarity duration C51.

The length of the first polarity duration C31 is longer than the length of the first polarity duration C51. The length of the first polarity duration C41 is longer than the length of the first polarity duration C31. The length of the second polarity duration C32, the length of the second polarity duration C42, and the length of the second polarity duration C52 are the same. The lengths of the first polarity durations C31, C41, and C51, for example, are equal to or longer than 5.0 ms (milliseconds) and are equal to or short than 20 ms (milliseconds). The lengths of the second polarity durations C32, C42, and C52 are shorter than 0.5 ms (milliseconds).

That is, in the same manner as the shift drive in FIG. 14A, the shift drive that is illustrated in FIG. 14B has a periodicity, a length of each periodicity, each duty ratio, a length of each first polarity duration, and a length of each second polarity duration, as drive parameters.

The alternating current drive that is illustrated in FIG. 15 is a leap drive in which an absolute value of the drive electric current I increases in each polarity state. In the leap drive that is illustrated in FIG. 15, the drive electric current I that is to be supplied to the discharge lamp 90, for example, is rectangular-wave alternating electric current of which an electric current value changes as Im1, Im2, −Im1, or −Im2. An absolute value of Im2 and −Im2 is greater than an absolute value of Im1 and −Im1. In the leap drive that is illustrated in FIG. 15, a length of a periodicity C6 is constant. A duty ratio of the alternating electric current that is illustrated in FIG. 15 is 0.5 (50%).

At the periodicity C6, a first polarity duration C61 that is the first polarity state and a second polarity duration C62 that is the second polarity state are provided. A length of the first polarity duration C61 and a length of the second polarity duration C62 are the same. The first polarity duration C61 includes the low electric current duration C61a and the high electric current duration C61b. The low electric current duration C61a is a duration during which the drive electric current I is at an electric current value Im1. The high electric current duration C61b is a duration during which the drive electric current I is at an electric current value Im2. A length of the high electric current duration C61b is shorter than a length of the low electric current duration C61a.

The second polarity duration C62 includes a low electric current duration C62a and a high electric current duration C62b. The low electric current duration C62a is a duration during which the drive electric current I is at an electric current value −Im1. The high electric current duration C62b is a duration during which the drive electric current I is at an electric current value −Im2. A length of the high electric current duration C62b is shorter than a length of the low electric current duration C62a. A length of the low electric current duration C61a is the same as the length of the low electric current duration C62a. A length of the high electric current duration C61b is the same as the length of the high electric current duration C62b.

That is, the leap drive that is illustrated in FIG. 15 has, as drive parameters, a periodicity, the length of the periodicity C6, the absolute value of the electric current value Im1 and −Im1, the absolute value of the electric current value Im2 and −Im2, the length of the first polarity duration C61, the length of the second polarity duration C62, the length of the low electric current duration C61a and the length of the high electric current duration C61b during the first polarity duration C61, the length of the low electric current duration C62a and the length of the high electric current duration C62b during the second polarity duration C62, a ratio for the low electric current duration C61a or the high electric current duration C61b during the first polarity duration C61, a ratio for the low electric current duration C62a or the high electric current duration C62b during the second polarity duration C62, a ratio of the absolute value of the electric current value Im2 and −Im2 and the absolute value of the electric current value Im1 and −Im1, and the like.

It is noted that in the above description, as an example of the alternating current drive, each of the drives that are illustrated in FIGS. 14A, 14B, and 15 is described, but no limitation to this is imposed. For example, each of the drives that are illustrated in FIGS. 14A, 14B, and 15 may be regarded as an example of the direct current drive. In this case, the polarity of the direct current drive and the length of the time for implementing the direct current drive are suitably changed, and thus the drive electric current waveform that is illustrated in each figure is created.

Furthermore, the discharge lamp lighting device 10 may include an illumination level sensor that measures an illumination level of a light that is emitted from the discharge lamp 90, and the illumination level information relating to the illumination level of the discharge lamp 90 may include a value that is measured by the illumination level sensor. In this case, the control unit 40 adjusts the drive electric power Wd in such a manner that the value which is measured by the illumination level sensor is an illumination level that serves as a target. With this configuration, the illumination level of the discharge lamp 90 can be directly measured. Because of this, the illumination level of the discharge lamp 90 can be adjusted with more precision to a target value.

Furthermore, in a case where the lamp voltage Vla is above the given voltage value VlaP, the adjustment of the drive electric power Wd by the control unit 40 according to the present embodiment, if based on the illumination level information on the illumination level of the discharge lamp 90, is not particularly limited. For example, in a case where the lamp voltage Vla is at or below the given voltage value VlaP, the control unit 40 may maintain the drive electric power Wd as constant. Furthermore, in a case where the lamp voltage Vla is above the given voltage value VlaP, the degree of lowering in the illumination level of the discharge lamp 90 with respect to the amount of the increase in the lamp voltage Vla may change according to the lamp voltage Vla. Furthermore, for example, in a case where the lamp voltage Vla is above the given voltage value VlaP, the illumination level of the discharge lamp 90 (the target illumination level maintenance ratio LrT) may change gradually for every range of the lamp voltages Vla.

Furthermore, the given voltage value VlaP is not particularly limited and may be the lamp voltage Vla in the initial stage. Furthermore, in a case where the given voltage value VlaP is set for the lamp voltage Vla in the initial stage, the given voltage value VlaP, for example, may be a value that is set in advance without depending on the individual difference of the discharge lamp 90.

Furthermore, the change in the target illumination level maintenance ratio LrT and a change in the illumination level maintenance ratio Lr may not be consistent with each other. For example, in a case where the target illumination level maintenance ratio LrT is maintained as being 100%, the illumination level maintenance ratio Lr may change in the vicinity of 100%.

Furthermore, the illumination level information relating to the illumination level of the discharge lamp 90, if a matter relating to the illumination level of the discharge lamp 90, is not particularly limited. The illumination level information, for example, may include a temperature of the discharge lamp 90. In this case, the discharge lamp lighting device 10 may include a temperature sensor that measures the temperature of the discharge lamp 90.

Furthermore, in the embodiments described above, the example of the case in which the invention is applied in a transmission type projector is described, but the invention can also be applied in a reflection type projector. At this point, the term "transmission type" refers to a type meaning that a liquid crystal light valve including a liquid crystal panel and the like transmits light. The term "reflection type" refers to a type meaning that a liquid crystal light valve reflects light. It is noted that the light modulation device is not limited to a liquid crystal panel and the like, and for example, may be a light modulation device that uses a micro-mirror.

Furthermore, in the embodiments described above, the example of the projector 500 that uses three liquid crystal panels, including the liquid crystal panels 560R, 560G, and 560B (the liquid crystal light valves 330R, 330G, and 330B) is given, but the invention can also be applied in a projector that uses one liquid crystal panel and a projector that uses four or more liquid crystal panels.

Furthermore, the configurations described above can be suitably combined within a range in which the configurations do not conflict with each other.

Embodiments

The utility of the invention was verified by comparison between Implementation Examples 1 and 2 and a comparative example. In Implementation Examples 1 and 2 and the comparative example, a plurality of drive patterns DW was set to be ones that were based on a drive pattern DW that had a drive electric current waveform which is illustrated in FIG. 9. Furthermore, three types of drive parameters for each of the alternating current drive and the direct current drive in the plurality of drive patterns DW were set that were a first frequency f1 and second frequency f2, lengths ta1 and ta2 of the time for performing alternating current drive, and lengths td1 and td2 of the time for performing the direct current drive. Moreover, as numerical values for every drive parameter, the first frequency f1 and the second frequency f2 were set to be selected from among 200 Hz, 300 Hz, and 400 Hz, the lengths ta1 and ta2 of the time for performing the alternating current drive were set to be selected from among 0.1 ms (milliseconds), 0.2 ms (milliseconds), and 0.5 ms (milliseconds), and the lengths td1 and td2 of the time for performing the direct current drive were set to be selected from among 10 ms (milliseconds), 20 ms (milliseconds), and 30 ms (milliseconds). Then, regarding the number of drive patterns DW, 27 patterns, which resulted from combining each of the three types of drive parameters and each of the numerical values, which are described above, were prepared.

In Implementation Examples 1 and 2, and the comparative example, 27 patterns, the drive patterns DW, which are the 27 patterns, were suitably selected and implemented using the machine learning according to the embodiments, which is described above. As the discharge lamp, a high pressure mercury lamp with a power rating of 230 W was used. An initial lamp voltage Vla in a case where a drive electric power Wd of 200 W was to be supplied to the discharge lamp was 65 V. Regarding the machine learning, the target numerical value range for the lamp voltage Vla was set to be 60 V or higher and 65 V or lower. Furthermore, in Implementation Examples 1 and 2, and the comparative example, the drive electric power Wd was adjusted in such a manner that the illumination level maintenance ratio Lr for the discharge lamp was the target illumination level maintenance ratio LrT. In Implementation Examples 1 and 2 and the comparative example, an upper limit of a rating power (230 W) was imposed on the drive electric power Wd.

In Implementation Examples 1 and 2, in a case where the lamp voltage Vla was at or below 65 V (the given voltage value VlaP), the target illumination level maintenance ratio LrT was maintained as being 100%. Furthermore, in Implementation Examples 1 and 2, in a case where the lamp voltage Vla was above 65 V (the given voltage value VlaP), the target illumination level maintenance ratio LrT was decreased according to the increase in the lamp voltage Vla, and the illumination level of the discharge lamp was decreased. An amount of decrease in the target illumination level maintenance ratio LrT in Implementation Example 1 was set to be 1% thereof in a manner that corresponds to an increase of 1 V in the lamp voltage Vla. An amount of decrease in the target illumination level maintenance ratio LrT in Implementation Example 2 was set to be 3% thereof in a manner that corresponds to the increase of 1 V in the lamp voltage Vla.

In the comparative example, the target illumination level maintenance ratio LrT was maintained as being 100% without depending on the lamp voltage Vla.

In Implementation Examples 1 and 2, and the comparative example, the illumination level of the discharge lamp was measured each time the accumulated lighting time 500 h (hours) elapsed after lighting-up for 2 h (hours) and lighting-out for 15 min (minutes) take alternately. In a case where the illumination level maintenance ratio Lr was calculated from the measured illumination level and the calculated illumination level maintenance ratio Lr was below 90%, the accumulated lighting time that resulted when the measurement was previously made was obtained as a value of the life. It is noted that the drive electric power Wd which was to be supplied to the discharge lamp when the discharge lamp was lighted up for the first time, was set to 200 W in Implementation Examples 1 and 2, and the comparative example.

The measurement and calculation described above were performed on 10 discharge lamps in the Implementation Examples 1 and 2 and the comparative example. An average value of the life that was obtained in each of the Implementation Examples 1 and 2 and the comparative example, and the average values were compared with each other. As a result, while the life reached 1500 h (hours) in the comparative example, the life reached 6000 h (hours) in Implementation Example 1, and the life reached 5000 h (hours) in Implementation Example 2. Therefore, this comparison verified that in the case where the lamp voltage Vla is above the given voltage value VlaP, the illumination level of the discharge lamp 90 is lowered according to the increase in the lamp voltage Vla and thus that the life of the discharge lamp can be effectively prolonged. As described above, the utility of the invention was verified.

The entire disclosure of Japanese Patent Application No. 2017-247349, filed Dec. 25, 2017 is expressly incorporated by reference herein.

What is claimed is:

1. A discharge lamp drive device comprising:
a discharge lamp driver configured to supply drive electric current to a discharge lamp having a first electrode and a second electrode;
a control unit configured to control the discharge lamp driver; and
a storage unit configured to store a plurality of drive patterns of the drive electric current,
wherein the control unit is configured to select one drive pattern from among the plurality of drive patterns based on machine learning, and implement the selected drive pattern, and
wherein the control unit is configured to adjust a drive electric power supplied to the discharge lamp based on illumination level information relating to an illumination level of the discharge lamp, while performing switching among the drive patterns based on the machine learning, in a case where an inter-electrode voltage of the discharge lamp is larger than a given voltage value.

2. The discharge lamp drive device according to claim 1, wherein the illumination level information includes the inter-electrode voltage, and
wherein the control unit adjusts the drive electric power so as to decrease the illumination level of the discharge lamp according to an increase in the inter-electrode voltage, in a case where the inter-electrode voltage is larger than the given voltage value.

3. The discharge lamp drive device according to claim 2, wherein the control unit adjusts the drive electric power so as to decrease the illumination level of the discharge lamp by a given amount of change with respect to an amount of the increase in the inter-electrode voltage, in a case where the inter-electrode voltage is larger than the given voltage value.

4. The discharge lamp drive device according to claim 1, wherein the control unit adjusts the drive electric power so as to maintain the illumination level of the discharge lamp as constant without depending on the inter-electrode voltage, in a case where the inter-electrode voltage is equal to or lower than the given voltage value.

5. The discharge lamp drive device according to claim 4, wherein the control unit supplies the drive electric current whose electric current value is constant to the discharge lamp, in a case where the inter-electrode voltage is equal to or lower than the given voltage value.

6. The discharge lamp drive device according to claim 1, further comprising:
an illumination level sensor configured to measure an illumination level of light emitted from the discharge lamp,
wherein the illumination level information includes a value measured by the illumination level sensor.

7. A projector comprising:
a discharge lamp configured to emit light;
the discharge lamp drive device according to claim 1;
a light modulation device configured to modulate the light emitted from the discharge lamp according to an image signal; and
a projection optical system configured to project the light modulated by the light modulation device.

8. A projector comprising:
a discharge lamp configured to emit light;
the discharge lamp drive device according to claim 2;
a light modulation device configured to modulate the light emitted from the discharge lamp according to an image signal; and
a projection optical system configured to project the light modulated by the light modulation device.

9. A projector comprising:
a discharge lamp configured to emit light;
the discharge lamp drive device according to claim 3;
a light modulation device configured to modulate the light emitted from the discharge lamp according to an image signal; and
a projection optical system configured to project the light modulated by the light modulation device.

10. A projector comprising:
a discharge lamp configured to emit light;
the discharge lamp drive device according to claim 4;
a light modulation device configured to modulate the light emitted from the discharge lamp according to an image signal; and
a projection optical system configured to project the light modulated by the light modulation device.

11. A projector comprising:
a discharge lamp configured to emit light;
the discharge lamp drive device according to claim 5;
a light modulation device configured to modulate the light emitted from the discharge lamp according to an image signal; and
a projection optical system configured to project the light modulated by the light modulation device.

12. A projector comprising:
a discharge lamp configured to emit light;
the discharge lamp drive device according to claim 6;
a light modulation device configured to modulate the light emitted from the discharge lamp according to an image signal; and
a projection optical system configured to project the light modulated by the light modulation device.

13. An discharge lamp drive method configured to supply drive electric current to a discharge lamp having a first electrode and a second electrode to drive the discharge lamp, the method comprising:
selecting one drive pattern from among a plurality of drive patterns of the drive electric current based on machine learning;
implementing the selected drive pattern; and
adjusting a drive electric power supplied to the discharge lamp based on illumination level information relating to an illumination level of the discharge lamp, while performing switching among the drive patterns based on the machine learning, in a case where an inter-electrode voltage of the discharge lamp is larger than a given voltage value.

* * * * *